US006455086B1

(12) United States Patent
Trinh et al.

(10) Patent No.: US 6,455,086 B1
(45) Date of Patent: Sep. 24, 2002

(54) MICROORGANISM REDUCTION METHODS AND COMPOSITIONS FOR FOOD CLEANING

(75) Inventors: Toan Trinh, Maineville; Brian Joseph Roselle, Fairfield; Alex Haejoon Chung; Philip Anthony Geis, both of West Chester; Thomas Edward Ward, Oregonia; David Kent Rollins, Cincinnati, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/446,218

(22) PCT Filed: Jun. 26, 1998

(86) PCT No.: PCT/US98/13279

§ 371 (c)(1),
(2), (4) Date: Dec. 16, 1999

(87) PCT Pub. No.: WO99/00025

PCT Pub. Date: Jan. 7, 1999

(51) Int. Cl.[7] ................................................. A23L 1/015
(52) U.S. Cl. ........................ 426/321; 426/335; 426/615; 252/108; 510/293
(58) Field of Search ................................ 426/321, 335, 426/615; 252/108; 510/293

(56) References Cited

U.S. PATENT DOCUMENTS

| | | | |
|---|---|---|---|
| 2,472,794 A | 6/1949 | Cothran | 99/156 |
| 3,169,564 A | 2/1965 | Harrington | 146/235 |
| 3,857,983 A | 12/1974 | Roth | 426/287 |
| 3,920,856 A | 11/1975 | Aepli et al. | 426/287 |
| 4,002,579 A | 1/1977 | Mizutani et al. | 252/544 |
| 4,140,649 A | 2/1979 | Bossert et al. | 252/105 |
| 4,177,294 A | 12/1979 | Lehmann et al. | 426/271 |
| 4,244,975 A | 1/1981 | Herbst et al. | 426/271 |
| 4,259,216 A | 3/1981 | Miyajima et al. | 252/545 |
| 4,287,102 A | 9/1981 | Miyajima et al. | 252/547 |
| 4,404,040 A | 9/1983 | Wang | 134/22.14 |
| 4,414,128 A | 11/1983 | Goffinet | 252/111 |
| 4,442,125 A | 4/1984 | Thiele | 424/318 |
| 4,592,892 A | 6/1986 | Ueno et al. | 422/28 |
| 4,808,330 A | 2/1989 | Chung | 252/170 |
| 4,857,345 A | 8/1989 | Sardo | 426/310 |
| 5,075,026 A | 12/1991 | Loth et al. | 252/122 |
| 5,094,868 A | 3/1992 | Wolfram et al. | 426/286 |
| 5,190,747 A | 3/1993 | Sekiguchi et al. | 424/56 |
| 5,280,042 A | 1/1994 | Lopes | |
| 5,306,444 A | 4/1994 | Kitamura et al. | 252/546 |
| 5,320,772 A | 6/1994 | Tricca | 252/160 |
| 5,342,630 A | 8/1994 | Jones | 424/717 |
| 5,366,995 A | 11/1994 | Savage et al. | 514/588 |
| 5,460,833 A | 10/1995 | Andrews et al. | 424/606 |
| 5,498,295 A | 3/1996 | Murch et al. | 134/16 |
| 5,500,048 A | 3/1996 | Murch et al. | 134/6 |
| 5,500,143 A | 3/1996 | Murch et al. | 252/108 |
| 5,503,764 A | 4/1996 | Murch et al. | 252/90 |
| 5,549,758 A | 8/1996 | Murch et al. | 134/6 |
| 5,749,924 A | 5/1998 | Murch et al. | 8/137 |
| 5,783,544 A * | 7/1998 | Trinh et al. | 510/293 |
| 5,849,678 A | 12/1998 | Murch et al. | 510/111 |
| 5,914,302 A | 6/1999 | Murch et al. | 510/293 |
| 5,932,527 A | 8/1999 | Roselle et al. | 510/111 |
| 5,972,857 A | 10/1999 | Roselle et al. | 510/111 |
| 5,997,654 A | 12/1999 | Murch et al. | 134/6 |

FOREIGN PATENT DOCUMENTS

| | | | |
|---|---|---|---|
| CA | 1166547 | 6/1981 | C11D/9/00 |
| DE | 4023418 A1 | 2/1992 | C11D/3/36 |
| WO | 95/12326 | 5/1995 | A23P/1/00 |
| WO | 97/01288 | 1/1997 | A23P/1/00 |
| WO | 97/01290 | 1/1997 | A23P/1/00 |
| WO | 97/01623 | 1/1997 | C11D/3/00 |
| WO | 97/15202 | 5/1997 | A23P/1/00 |

OTHER PUBLICATIONS

Code of Federal Regulations, Food and Drugs, §173.315, "Chemicals used in Washing or to Assist in the Lye Peeling of Fruits and Vegetables", Feb, 1992.

Webster's Seventh New Collegiate Dictionary, G.&C. Merriam Company 1969, p. 154.

* cited by examiner

*Primary Examiner*—Helen Pratt
(74) *Attorney, Agent, or Firm*—Jason J. Camp; Kim William Zerby; Stephen W. Miller

(57) ABSTRACT

Basic food cleaning compositions using food compatible ingredients for treating food such as produce, e.g., fruits and vegetables, and edible animal proteins are provided with specific non-substantive perfume. Liquid and solid powder formulations diluted with water also containing non-substantive perfume are applied to food products immediately before consumption and allowed to stay for at least about one half minute to significantly reduce microorganism contamination. With the preferred processes, the food can be consumed without rinsing.

39 Claims, No Drawings

MICROORGANISM REDUCTION METHODS AND COMPOSITIONS FOR FOOD CLEANING

TECHNICAL FIELD

The present invention relates to methods for making food, especially produce, safe for human consumption, while maintaining the palatability of said food, especially where sufficient pure water for rinsing said food is not available, and to compositions, especially in concentrated, or the corresponding diluted liquid form, which are suitable for practicing said methods.

BACKGROUND OF THE INVENTION

Fruits and vegetables, and sometimes other food products such as meats, poultry, fish and other seafood, and the like, are desirably washed prior to ingestion in order to remove soils and other unwanted residues which can be undesirably clinging to the surfaces thereof. Besides dirt, there can be other types of unwanted residues such as chemical residues and biological residues. Examples of chemical residues are pesticides, herbicides, fungicides, and fertilizers. Examples of biological residues are microorganisms that can be pathogenic. Uncooked protein food such as meat, poultry, fish and other seafood can develop undesirable odors, especially when they are stored for some time and are not fresh. It is desirable to have an effective cleaning method to remove these unwanted residues from food. The usual washing process requires a rinse step to effect physical removal of the soil and other unwanted residues. In many situations, however, a ready source of clean and/or pure water is not available for rinsing, even at a low level. It will be appreciated that the formulation of truly effective compositions, especially those which can be used safely by individual consumers, for making food, e.g., fruits and vegetables safe to eat and palatable, when an abundant source of safe water is not available for rinsing, presents a unique problem to the formulator. Many art-disclosed cleaning ingredients would, presumably, not be desirable for use in direct contact with foods where they are not completely removed and/or would not provide sufficient antimicrobial action.

Moreover, it would be especially desirable to provide effective, food compatible compositions for food, including fruits and vegetables and/or meats that can be sold in concentrated form and used to create dilute low-sudsing liquid solutions which can be used to effect antimicrobial action and which provide palatable food without a need for a rinse step. Dilute liquid solutions are convenient for the user, since they can be applied directly to soiled fruits and vegetables by simple immersion, thus ensuring that all parts of the food are treated. Clarity of the dilute liquids connotes cleanliness to the user and is thus highly desirable. Low sudsing is an important attribute so that the elimination of any suds is achieved quickly and easily. It is also of advantage if such concentrates can be diluted by the consumer using water that is not safe for use, since that is sometimes the only water that is available.

The present invention relates to food cleaning compositions, articles of manufacture and/or methods for treating food with said compositions. Preferably, food is immerged into said diluted compositions, with optional scrubbing, to remove unwanted residues and/or to restore their freshness, e.g., by reducing the unwanted off-odor, followed by draining and/or drying, especially without rinsing, said food being then ready for consumption and having desirable palatability. An optional rinsing step can also be done if clean water is available.

Food cleaning compositions of the present invention also provides a "scent signal" in the form of a pleasant odor, such as a fruity odor, which signals the removal of the malodor and/or other undesirable materials. The pleasant scent signal is provided by a perfume composition which is preferably "non-substantive". A non-substantive perfume provides a pleasant odor but does not have the tendency to adhere to the food surface. Such non-substantive perfume is composed mainly of volatile perfume ingredients and/or ingredients that are fairly water soluble. For food cleaning compositions of this invention which are of solid, powder, or granular form, such volatile perfume composition is optionally, but preferably, contained in a water-activated perfume carrier which releases the perfume when the food cleaning composition is diluted with water. Examples of preferred water-activated perfume carriers are cyclodextrins, water-activated microcapsules, and mixtures thereof. It is also preferred that the food cleaning composition contain both encapsulated and free perfume.

It is desirable to provide further improvements such as a food compatible antimicrobial active and/or disinfectant that provides substantial reduction of microorganisms that cause, e.g., infections, etc., which can exist on food.

The food cleaning composition of the present invention can optionally contain odor controlling actives such as uncomplexed cyclodextrins and/or water soluble metal salts. Uncomplexed cyclodextrin molecules, which are made up of varying numbers of glucose units can absorb many organic materials, such as the chemical residues and off-odor molecules to improve their removability. Optional water soluble metal salts can also be added to complex with some nitrogen-containing and sulfur-containing pesticides and/or malodor molecules.

It is desirable for the materials incorporated in the food cleaning compositions of the present invention to be "food compatible", e.g., suitable for direct or indirect food contact use and/or which can be approved as GRAS, prior sanctioned, or subject to GRAS approval via a GRAS petition, for example, a new chemical developed for this invention, and/or toxicologically acceptable to humans under usage conditions. Materials added to foods (additives) can be categorized as one of several types: (1) direct food additives; (2) indirect food additives; (3) GRAS ingredients (generally recognized as safe) either as direct or indirect food substances; (4) GRAS affirmed, a chemical which may be considered for GRAS classification after experts review adequate technical support data for the GRAS petition; and (5) prior sanctioned, a food ingredient of known food use and granted approval with respect to use of the substance in food prior to September 1958, by the FDA, or USDA.

Food additives include substances the intended use of which results or may reasonably be expected to result, directly or indirectly, either in their becoming a component of food or otherwise affecting the characteristics of food. As an example, a material used in the production of food containers and/or packaging materials is subject to the definition if it may become an ingredient in the food, or to affect the characteristics, directly or indirectly, of the food in the container or package. In net, direct food additive are those materials which are added directly to foods to achieve a desirable or intended purpose.

Indirect food additives are those which are added to food containers and/or packages, and which may result in the food simply because of contact of the container/package with the food. Indirect food additives may include: (1) adhesives and components of coatings; (2) paper and paperboard components; (3) adjuvants, such as those used in the manufacture of foamed plastics, and sanitizers. Sanitizers used in food applications, as direct or indirect, are many and can consist of, but are not limited to: (1) aqueous hypochlorite (K, Na or Ca salts); (2) aqueous solutions of dichloroisocyanuric acid, trichloroisocyanuric acid, or the sodium or potassium salts of these acids, either with, or without, the bromides of potassium, sodium, and/or calcium; (3) anionic surfactant solutions such as dodecylbenzene sulfonic acid, and/or sodium lauryl sulfate; or mixtures of these together or with other anionic surfactants as allowed under FDA regulations; (4) aqueous fatty acid solutions containing decanoic acid, octanoic acid, lactic acid and other ingredients; (5) aqueous solutions comprised of hydrogen peroxide, peroxyacetic acid, acetic acid, sulfuric acid and other ingredients as allowed by FDA regulations: (6) quaternary sanitizers such as di-n-alkyl ($C_{8-10}$) dimethylammonium chloride components, n-alkyl ($C_{12-16}$) benzyl-dimethylammonium chloride components along with other quaternary actives; (7) aqueous solutions containing ortho-phenylphenol. ortho-benzyl-para-chlorophenol, para-tertiaryamylphenol and/or other ingredients as allowed under FDA regulations.

Substances added directly to human food can be affirmed as generally recognized as safe (GRAS). Direct GRAS ingredients shall be used under current good manufacturing practice which includes that a direct human food ingredient be of appropriate food grade; that it be prepared and handled as a food ingredient, and that the quantity of the ingredient added to food does not exceed the amount reasonably required to accomplish the intended physical, nutritional, or other technical effect in the food item.

Indirect GRAS ingredients are those which can be used in the container, packaging and/or wrapper, and which may migrate into the food items because of their close proximity to the food. Indirect GRAS ingredients shall be used under current good manufacturing practice which includes that an indirect human food ingredient be of appropriate purity; and that the quantity of the ingredient added to food container, packaging, wrapper, etc. does not exceed the amount reasonably required to accomplish the intended physical, nutritional, or other technical effect in the food-contact item.

Preferably, the term "food compatible" is used to indicate that any residues from the ingredients of the compositions which may remain on the food, e.g., fruits or vegetables cleansed therewith are safe for ingestion by humans and/or animals.

SUMMARY OF THE INVENTION

The present invention encompasses methods for treating food, including produce, especially fruits and vegetables, preferably at a basic pH, especially without rinsing, while maintaining palatability, and compositions, as disclosed hereinafter, for practicing said methods, while providing a desirable scent signal. In its broadest aspect, it comprises a method for treating food to reduce the level of microorganisms, said treatment occurring just prior to consumption, comprising the step of contacting the surface of said food with an aqueous treatment composition for a period of time in excess of about one half of a minute, said composition comprising: (1) a sanitizer to provide a germicidal benefit, i.e., to reduce the level of microorganisms, (2) nonsubstantive perfume, preferably having fruity odor, to provide a pleasant, positive scent signal; and (3) optionally detergent surfactant to improve cleaning; the composition being essentially free of any material that adversely affects palatability, wherein said food does not need to be rinsed before consumption. The method of the present invention is particularly useful when the water which is available for cleaning is itself contaminated with microorganisms.

The present invention comprises several more specific aspects including:

A method for making food, including produce and meat, safe to eat comprising contacting the surfaces of said food, shortly before ingestion so as to minimize the chances for recontamination, by direct application of a dilute, i.e., usage, aqueous treatment composition (usage composition), typically comprising:

(A) an effective amount of food compatible sanitizer to reduce the level of microorganisms, selected from the group consisting of: (1) basic buffer, preferably water soluble potassium and/or sodium and/or calcium hydroxides, ortho-phosphates, carbonates, and/or bicarbonates, to provide a pH of from about 10.5 to about 13, preferably from about 10.9 to about 12.5, more preferably from about 11.3 to about 12.3, but preferably with low reserve alkalinity that is typically less than about 10, preferably less than about 7, and even more preferably less than about 4; (2) water soluble bleach, such as, chlorine bleach (e.g., hypochlorite salts, dichloroisocyanuric acid, trichloroisocyanuric acid, and/or sodium or potassium salts thereof), peroxygen bleach (e.g., hydrogen peroxide, perborate salts, and the like); (3) water soluble antimicrobials, such as organic acids (e.g., decanoic acid, octanoic acid, lactic acid, and the like), quaternary sanitizers, (e.g., di-n-alkyl ($C_{8-10}$) dimethylammonium chloride, n-alkyl ($C_{12-16}$) benzyl-dimethylammonium chloride, and other quaternary actives), phenyl and phenolic compounds (e.g., ortho-phenylphenol, ortho-benzyl-para-chlorophenol, para-tertiaryamylphenol, and the like), biguanides (e.g., chlorhexidine), and mixtures thereof; and (4) mixtures thereof, (B) an effective amount to provide a desirable odor effect, of food compatible, nonsubstantive perfume, preferably comprising perfume ingredients having either a boiling point of about 250° C. or lower, or a ClogP value of about 3.0 or smaller, or both, preferably having a fruity odor;

(C) optionally, but highly preferably, sufficient food compatible detergent surfactant, to reduce the surface tension and to reduce the viscosity to less than about 50 cp., preferably to less than about 10 cp., and more preferably to less than about 5 cp., to help maximize surface wetting and/or drainage thus minimizing residue, but less than an amount that will affect palatability, preferably less than about 0.5%, more preferably less than about 0.2%, and even more preferably less than about 0.1%, by weight of the usage composition, preferably base-stable anionic surfactant, and more preferably, sodium and/or potassium alkyl sulfate and/or $C_{818}$, preferably $C_{8-14}$, soap;

(D) optionally, from about 0.0005% to about 3%, preferably from about 0.001% to about 1%, and more preferably from about 0.003% to about 0.5%, by weight of calcium ion sequestrant, preferably polyphosphate detergent builder such as the sodium salt of tripolyphosphate (referred to hereinafter as "STPP") or, a salt of an organic polycarboxylic acid, such as the sodium salt of ethylenediaminetetraacetic acid (referred to hereinafter as "EDTA".) and/or a salt of citric acid to sequester calcium in hard water to control calcium precipitates;

(E) optionally, uncomplexed cyclodextrin;
(F) optionally, food compatible preservative;
(G) optionally, food compatible suds suppressor; and
(H) the balance comprising diluent, i.e., filler, including aqueous carrier selected from water and, optionally, low levels of low molecular weight, food compatible organic solvent such as ethanol, glycerol, etc. and/or minor ingredients;

said composition being essentially free of any material that is not food compatible, said treatment being for a period of time of at least one half minute, preferably at least about 1 minute, and more preferably at least about 5 minutes, followed by draining and/or drying (e.g., by evaporation, drainage, and/or absorption, especially without rinsing, said food being then ready for consumption and having desirable palatability.

The inventions disclosed herein preferably encompass concentrated liquid and/or solid powder compositions suitable for use in preparing such dilute usage compositions for treating food, by diluting with water using from about 0.1% to about 5%, preferably from about 0.5% to about 2%, of the concentrated composition, by weight of the usage composition, said concentrated composition comprising:

(A) an effective amount of food compatible sanitizer to reduce the level of microorganisms, selected from the group consisting of: (1) basic buffer, preferably potassium and/or sodium and/or calcium hydroxide, orthophosphate, carbonate, and/or bicarbonate, to provide a pH of from about 10.5 to about 13, preferably from about 10.9 to about 12.5, more preferably from about 11.3 to about 12.3, in said dilute composition, but with low reserve alkalinity in said dilute composition, preferably less than about 10, more preferably less than about 7 and even more preferably less than about 4, to avoid damage to a human; (2) water soluble bleach, such as, chlorine bleach (e.g., hypochlorite salts, dichloroisocyanuric acid, trichloroisocyanuric acid, and/or sodium or potassium salts thereof), peroxygen bleach (e.g., hydrogen peroxide, perborate salts, and the like); (3) water soluble antimicrobials, such as organic acids (e.g., decanoic acid, octanoic acid, lactic acid, and the like), quaternary sanitizers, (e.g., di-n-alkyl ($C_{8-10}$) dimethylammonium chloride, n-alkyl ($C_{12-16}$) benzyl-dimethylammonium chloride, and other quaternary actives), phenyl and/or phenolic compounds (e.g., ortho-phenylphenol, ortho-benzyl-para-chlorophenol, para-tertiaryamylphenol, and the like), biguanides (e.g., chlorhexidine), and mixtures thereof; and (4) mixtures thereof;

(B) an effective amount of food compatible, nonsubstantive perfume, preferably having a fruity odor, and for solid powder compositions, the whole or part of said non-substantive perfume composition is optionally, but highly preferably, encapsulated, e.g., in cyclodextrin and/or in moisture-activated microcapsules;

(C) from about 0.1% to about 50%, preferably from about 0.5% to about 20%, and more preferably from about 1% to about 10%, by weight of food compatible detergent surfactant, preferably base-stable anionic surfactant, and more preferably, a $C_{6-16}$ alkyl sulfate and/or $C_{8-18}$ soap;

(D) optionally, from about 0.1 to about 35%, preferably from about 1 to about 25%, more preferably from about 2 to about 20%, of food compatible calcium ion sequestrant, preferably polyphosphate or organic polycarboxylate, more preferably STPP or EDTA, or combinations of the two, to control calcium ions;

(E) optionally, uncomplexed cyclodextrin;
(F) optionally, food compatible preservative;
(G) optionally, food compatible suds suppressor; and
(H) the balance comprising food compatible inert filler and/or minor ingredients.

In all of the above lists of components, if an ingredient can be classified in more than one place, it will be classified in the first place it can appear. Preferably all ingredients are food compatible, since they can be ingested, albeit in very small amounts.

A more specific method for preparing food, especially produce such as fruits and vegetables involves exposing the food to a dilute aqueous solution for a period of time of more than about one half of a minute, said aqueous cleaning solution comprising potassium cations and/or sodium cations. These cations are desirable in the diet for many reasons. Therefore, their presence in a composition for use in treating food materials like vegetables and fruits without rinsing is desirable. Also, the potassium cation is more useful than the sodium cation for soaps, since the potassium soaps are quite soluble as compared to the sodium soaps, especially at low temperatures.

An alkaline method for treating food comprises contacting the surfaces of produce with an aqueous solution prepared by creating a solution having a pH of from about 10.5 to about 13, preferably from about 10.9 to about 12.5, more preferably from about 11.3 to about 12.3, using the concentrated composition above and impure water, to provide pure solutions that kill microorganisms on the surface of food. It is important to reduce the level of microorganisms on the surface of food.

Another preferred variation in the above methods for treating food such as produce involves placing concentrated compositions, as disclosed herein, into containers in association with instructions to use the composition to form said dilute solutions to treat food. Such instructions are very important, since the amount of dilution, the time of treatment, the elimination of the need for rinsing, and the ability to use impure water to form the treatment solution are not intuitive. It is also important that the instructions be as simple and clear as possible, so that using pictures and/or icons is desirable.

The balance of the composition can comprise various optional adjunct materials, pH-adjusting agents, preservatives, suds suppressors, and the like.

The ingredients in the above concentrated compositions are preferably "food grade" and selected and used in proportions which provide substantially clear dilute compositions. "Substantially clear" includes only minimal haziness, and preferably the compositions are completely clear. The ingredients are also selected to have minimal odor, both initially and after storage. The lack of odor for the ingredients is especially important in the compositions for use on food herein which possess the desirable perfume scent signal.

As disclosed hereinbefore, preferred compositions for use herein contain only materials that are food grade or GRAS, including, of course, direct food additives affirmed as GRAS, to protect against possible misuse by the consumer. Traditionally, most suggestions for cleaning of fruits and/or vegetables have contemplated a commercial scale where there is typically more control over the conditions, especially the amount and thoroughness of rinsing. The present invention includes use by individual consumers without rinsing, so that it is essential that extra safety be built into the product. Failure to rinse thoroughly after cleaning is less of a concern if all of the ingredients are GRAS and/or food grade.

DETAILED DESCRIPTION OF THE INVENTION

The present invention encompasses methods for treating food, including produce, especially fruits and vegetables, preferably at a basic pH, especially without rinsing, while maintaining palatability, and compositions, as disclosed hereinafter, for practicing said methods. In its broadest aspect, it comprises a method for treating food to reduce the level of microorganisms, said treatment occurring just prior to consumption, comprising the step of contacting the surface of said food with an aqueous treatment composition for a period of time in excess of about one half of a minute, said composition comprising: (1) an effective amount of food compatible sanitizer to reduce the level of microorganisms, (2) an effective amount of nonsubstantive perfume, preferably having fruity odor, to provide a desirable scent signal; and (3) optionally, an effective amount of food compatible detergent surfactant to reduce surface tension and/or viscosity; the composition being essentially free of any material that adversely affects palatability or that is not food compatible, whereby said food does not need to be rinsed before consumption. The method of the present invention is particularly useful when the water which is available for cleaning is itself contaminated with microorganisms. The method enables one to simultaneously purify the water and clean the food.

The present invention comprises several more specific aspects including:

A method for making food, including produce and meat, safe to eat comprising contacting the surfaces of said food, shortly before ingestion so as to minimize the chances for recontamination, by direct application of a dilute aqueous treatment composition (usage composition), typically comprising:

(A) an effective amount of food compatible sanitizer to reduce the level of microorganisms, selected from the group consisting of: (1) basic alkaline buffer, preferably potassium and/or sodium and/or calcium hydroxide, orthophosphate, carbonate, and/or bicarbonate, to provide a pH of from about 10.5 to about 13, preferably from about 10.9 to about 12.5, more preferably from about 11.3 to about 12.3, in said dilute composition, but with low reserve alkalinity in said dilute composition, preferably less than about 10, more preferably less than about 7 and even more preferably less than about 4, to avoid damage to humans; (2) water soluble bleach, such as, chlorine bleach (e.g., hypochlorite salts, dichloroisocyanuric acid, trichloroisocyanuric acid, and/or sodium or potassium salts thereof), peroxygen bleach (e.g., hydrogen peroxide, perborate salts, and the like); (3) water soluble antimicrobials, such as organic acids (e.g., decanoic acid, octanoic acid, lactic acid, and the like), quaternary sanitizers, (e.g., di-n-alkyl ($C_{8-10}$) dimethylammonium chloride, n-alkyl ($C_{12-16}$) benzyl-dimethylammonium chloride, and other quaternary actives), phenyl and/or phenolic compounds (e.g., ortho-phenylphenol, ortho-benzyl-para-chlorophenol, para-tertiaryamylphenol, and the like), biguanides (e.g., chlorhexidine), and mixtures thereof; and (4) mixtures thereof;

(B) an effective amount to provide a desirable scent signal of food compatible, nonsubstantive perfume, preferably having a fruity odor, and, for solid, e.g., powder compositions, the whole or part of said non-substantive perfume composition is optionally, but highly preferably, encapsulated, e.g., in cyclodextrin and/or in moisture-activated microcapsules;

(C) optionally, but highly preferably, sufficient food compatible detergent surfactant to reduce the surface tension and to reduce the viscosity to less than about 50 cp., preferably to less than about 10 cp., and more preferably to less than about 5 cp., to help maximize surface wetting and/or drainage thus minimizing residue, but less than an amount that will affect palatability, preferably less than about 0.5%, more preferably less than about 0.2%, and even more preferably less than about 0.1%, said food compatible detergent surfactant preferably being base-stable anionic surfactant, and more preferably, sodium and/or potassium alkyl sulfate and/or $C_{8-18}$, preferably $C_{8-14}$ soap and/or mixtures thereof;

(D) optionally, from about 0.0005% to about 3%, preferably from about 0.001% to about 1%, and more preferably from about 0.003% to about 0.5%, by weight of calcium ion sequestrant, preferably polyphosphate detergent builder such as the sodium salt of tripolyphosphate (referred to hereinafter as "STPP") or, a salt of an organic polycarboxylic acid, such as the sodium salt of ethylenediaminetetraacetic acid (referred to hereinafter as "EDTA".) and/or a salt of citric acid to sequester calcium in hard water to control calcium precipitates;

(E) optionally, food compatible uncomplexed cyclodextrin;

(F) optionally, food compatible preservative;

(G) optionally, food compatible suds suppressor; and (H) the balance comprising an aqueous carrier selected from water and, optionally, low levels of low molecular weight, food compatible organic solvent such as ethanol, glycerol, etc. and/or minor ingredients;

all of the acidic materials above being, of course, neutralized when the product is alkaline, and said composition being essentially free of any material that is not food compatible, said treatment being for a period of time of at least one half minute, preferably at least about 1 minute, and more preferably at least about 5 minutes, followed by draining and/or drying, especially without rinsing, said food being then ready for consumption and having desirable palatability.

The inventions disclosed herein preferably encompass concentrated liquid and/or solid powder compositions suitable for use in preparing such dilute usage compositions for treating food, by diluting with water using from about 0.1% to about 5%, preferably from about 0.5% to about 2%, of the concentrated composition, by weight of the usage composition, said concentrated composition comprising:

(A) an effective amount of food compatible sanitizer to reduce the level of microorganisms after dilution, selected from the group consisting of: (1) basic alkaline buffer, preferably potassium and/or sodium and/or calcium hydroxide, orthophosphate, carbonate, and/or bicarbonate, to provide a pH of from about 10.5 to about 13, preferably from about 10.9 to about 12.5, more preferably from about 11.3 to about 12.3, in said dilute composition, but with low reserve alkalinity in said dilute composition, preferably less than about 10, more preferably less than about 7 and even more preferably less than about 4, to avoid damage to humans; (2) water soluble bleach, such as, chlorine bleach (e.g., hypochlorite salts, dichloroisocyanuric acid, trichloroisocyanuric acid, and/or sodium or potassium salts thereof), peroxygen bleach (e.g., hydrogen peroxide, perborate salts, and the like); (3) water soluble antimicrobials, such as organic acids (e.g., decanoic acid, octanoic acid, lactic acid, and the like), quaternary sanitizers, (e.g., di-n-alkyl ($C_{8-10}$) dimethylammonium chloride, n-alkyl ($C_{12-16}$) benzyldimethylammonium chloride, and other quaternary actives), phenols (e.g., ortho-phenylphenol, ortho-benzyl-para-chlorophenol, para-tertiaryamylphenol, and the like), biguanides (e.g., chlorhexidine); and (4) mixtures thereof;

(B) an effective amount to provide a desirable scent signal after dilution of food compatible, nonsubstantive perfume, preferably comprising perfume ingredients having either a boiling point of about 250° C. or lower, or a ClogP value of about 3.0 or smaller, or both, preferably having a fruity odor, and, for solid powder compositions, the whole or part of said non-substantive perfume composition is optionally, but highly preferably, encapsulated, e.g., in cyclodextrin and/or in moisture-activated microcapsules;

(C) from about 0.1% to about 50%, preferably from about 0.5% to about 20%, and more preferably from about 1% to about 10%, by weight of food compatible detergent surfactant, preferably base-stable anionic surfactant, and more preferably, a $C_{6-16}$ alkyl sulfate and/or $C_{8-18}$ soap;

(D) optionally, from about 0.1 to about 35%, preferably from about 1 to about 25%, more preferably from about 2 to about 20%, of food compatible calcium ion sequestrant, preferably polyphosphate or organic polycarboxylate, more preferably STPP or EDTA, or combinations of the two, to control calcium ions;

(E) optionally, food compatible uncomplexed cyclodextrin;

(F) optionally, food compatible preservative;

(G) optionally, food compatible suds suppressor; and (H) the balance comprising food compatible inert filler and/or minor ingredients the ingredients being at levels that allow for dilution with water to create effective food cleaning compositions.

In all of the above lists of components, if an ingredient can be classified in more than one place, it will be classified in the first place it can appear. Preferably all ingredients are food compatible, since they may be ingested, albeit in very small amounts.

A more specific method for preparing food, especially produce such as fruits and vegetables, involves exposing the food to a dilute aqueous solution for a period of time of more than about one half of a minute, said aqueous cleaning solution comprising potassium cations and/or sodium cations. These cations are desirable in the diet for many reasons. Therefore, their presence in a composition for use in treating food materials like vegetables and fruits without rinsing is desirable. Also, the potassium cation is more useful than the sodium cation for soaps, since the potassium soaps are quite soluble as compared to the sodium soaps, especially at low temperatures.

An alkaline method for treating food comprises contacting the surfaces of produce with an aqueous solution prepared by creating a solution having a pH of from about 10.5 to about 13, preferably from about 10.9 to about 12.5, more preferably from about 11.3 to about 12.3, using the concentrated composition disclosed above and impure water, to provide pure solutions that kill microorganisms on the surface of food. It is important to reduce the level of microorganisms on the surface of food.

Another preferred variation in the above methods for treating food such as produce involves placing concentrated compositions, as disclosed herein, into containers in association with instructions to use the composition to form said dilute solutions to treat food. Such instructions are very important, since the amount of dilution, the time of treatment, the elimination of the need for rinsing, and the ability to use impure water to form the treatment solution are not intuitive. It is also important that the instructions be as simple and clear as possible, so that using pictures and/or icons is desirable. Preferably, the vessels used to prepare the dilute/treatment compositions have markings that facilitate accurate measurements, since it is extremely important that the dilute treatment compositions contain sufficient material to provide the desired antimicrobial effects.

The balance of the composition can comprise various optional adjunct materials, pH-adjusting agents, preservatives, suds suppressors, and the like.

The ingredients in the above concentrated compositions are preferably "food grade" and are selected and used in proportions which provide substantially clear dilute compositions. "Substantially clear" includes only minimal haziness, and preferably the compositions are completely clear. The ingredients are also selected to have minimal odor, except for the perfumes that are added, both initially and after storage. The lack of ingredient odor is especially important in compositions for use on food.

In order to mask any objectionable odor, the compositions contain a food grade or GRAS perfume, or essence, composition comprising nonsubstantive perfume ingredients. Especially preferred for this use are compositions having a fruity odor, comprising oils derived from citrus fruit, e.g., oranges, lemons, limes, grapefruits, tangerines, tangelos, etc. which contain relatively large amounts of terpenes.

As disclosed hereinbefore, preferred compositions for use herein contain only materials that are food grade or GRAS, including, of course, direct food additives affirmed as GRAS, to protect against possible misuse by the consumer. Traditionally, most suggestions for cleaning of fruits and/or vegetables have contemplated a commercial scale where there is typically more control over the conditions, especially the amount and thoroughness of rinsing. The present invention includes use by individual consumers without rinsing, so that it is essential that extra safety be built into the product. Failure to rinse thoroughly after cleaning is less of a concern if all of the ingredients are GRAS and/or food grade.

In the United States of America, the use and selection of cleaning ingredients for the purpose of washing fruits and vegetables is described by the United States Code of Federal Regulations, Title 21, Section 173.315: "Ingredients for use in washing or lye peeling of fruits and vegetables". These regulations restrict the ingredients that can be used for direct contact with food to those described as "generally regarded as safe" (GRAS), and a few other selected ingredients. These sections also provide certain limitations on the amount of material that can be used in a given context. However, there are no regulations, or suggestions, for methods of making food safe for consumption using aqueous compositions that do not need to be removed. Also, there is no known method for killing microbes using materials like hypochlorite, iodine, etc. at low levels that provide desirable palatability. Other countries normally have similar regulations, albeit, not identical.

All documents cited herein are incorporated herein by reference.

Compositions

The following food compatible ingredients are used in the preparation of the preferred compositions herein.

A. Food Compatible Sanitizer

1. Alkaline Buffer

Food compatible basic buffers are used in the compositions herein to maintain product pH in the desired basic range of from about 10.5 to about 13, preferably from about 10.9 to about 12.5, more preferably from about 11.3 to about 12.3, in said dilute usage composition. For ease of formulatability, it is often desirable that such basic buffers be in their potassium salt form, especially in liquid concentrates. Sodium salts are acceptable, and even preferred, in solid, e.g., powder formulas. Potassium/sodium carbonate and/or potassium/sodium orthophosphate are convenient and preferred basic pH buffers. Other readily water soluble alkali metal and/or ammonium salts of polyphosphates (e.g., tripolyphosphates, pyrophosphates, and glassy polymeric meta-phosphates) are also useful and preferred, where phosphorus-based basic buffer materials can be used in cleaning products. Calcium and/or magnesium hydroxides can also be used to create a basic pH, especially if the composition does not contain calcium ion sequestrant. Sodium and/or potassium hydroxides can be used as part of alkaline buffer systems. The levels and identities of the ingredients are adjusted to provide dilute products having the desired viscosities as set forth herein, e.g., less than about 50, preferably less than about 10, more preferably less than about 5 centipoise under shear of $\geq \sim 1000$ sec$^{-1}$.

The pH is preferably not greater than about 13, and especially does not contain large amounts of buffer at higher pHs for consumer safety, i.e., to avoid damage to human, especially when the compositions are not fully removed. Reserve alkalinity is typically from about 0.1 to about 10, preferably from about 0.2 to about 7, and more preferably from about 0.3 to about 4. "Reserve alkalinity" as used herein is equal to the percent of HCl equivalent needed to lower the pH of the dilute treatment composition to 9.5. The level of orthophosphate, when present, is typically from about 0.01% to about 3%, preferably from about 0.05% to about 1%, more preferably from about 0.1% to about 0.5% of orthophosphoric acid equivalent, by weight of the usage composition, and from about 3% to about 60%, preferably from about 5% to about 60%, more preferably from about 10% to about 55%, of ortho-phosphoric acid equivalent, by weight of the concentrated composition.

2. Water Soluble Bleach

Bleaching agents useful in the present invention include both chlorine based and hydrogen peroxide based bleaching ingredients.

Chlorine Bleach

Preferred bleaching agent is one which yields a hypochlorite ions in the usage composition. The hypochlorite ion is chemically represented by the formula OCl. The hypochlorite ion is a strong oxidizing agent and for this reason materials which yield these ions are considered to be powerful bleaching agents. These bleaching agents provide very effective sanitization and/or germicidal benefit.

The strength of an aqueous solution containing hypochlorite ion is measured in terms of available chlorine. This is the oxidizing power of the solution measured by the ability of the solution to liberate iodine from an acidified iodine solution. One hypochlorite ion has the oxidizing power of 2 atoms of chlorine, i.e., one molecule of chlorine gas.

At lower pH levels, aqueous solutions formed by dissolving hypochlorite-yielding compounds contain active chlorine partially in the form of hypochlorous acid moieties and partially in the form of hypochorite ions. At pH levels above 10, i.e. at the preferred pH levels of some instant compositions, essentially all of the active chlorine is in the form of hypochlorite ion.

Non limiting examples of bleaching agents which yield hypochlorite ions in aqueous solution include alkali metal and alkaline earth metal hypochlorites, hypochloride addition products, chloramines, chlorimines, chloramides, and chlorimides. Specific examples of compounds of this type include sodium hypochlorite, potassium hypochlorite, monobasic calcium hypochlorite, dibasic magnesium hypochlorite, chlorinated trisodium phosphate dodecahydrate, potassium dichloroisocyanurate, sodium dichloroisocyanurate, sodium dichloroisocyanurate dihydrate, trichlorocyanuric acid, 1,3-dichloro-5,5-dimethylhydantoin, N-chlorosulfamide, Chloramine T, Dichloramine T, Chloramine B and/or Dichloramine B. Preferred chlorine bleaching agents for use in the compositions of the present invention include hypochlorite salts, dichloroisocyanuric acid, trichloroisocyanuric acid, and/or sodium or potassium salts thereof, and/or chlorinated trisodium phosphate. Chlorinated trisodium phosphate is typically commercially available as chlorinated trisodium phosphate dodecahydrate. The most preferred chlorine bleach material is sodium dichloroisocyanurate; the dihydrate of this material is particularly preferred due to its excellent stability.

Most of the above-described hypochlorite-yielding bleaching agents are available in solid or concentrated form and can be dissolved in water. Some of the above materials are available as aqueous solutions. Chlorine bleaching agents are very effective, and should be used only at low levels, to avoid any noticeable odor and/or taste impacted on the treated food. Chlorine bleaching agents, when present, can generally comprise from about 0.001% to about 2%, preferably from about 0.01% to about 1%, more preferably from about 0.1% to about 0.5% of available chlorine, by weight of the concentrated composition. The concentrated composition is diluted with water to yield a diluted solution, i.e., the usage composition, containing at least an effective amount of oxygen bleach. The term "effective amount" as herein defined means a level sufficient to reduce the number of viable microorganisms at least about one thousand times (a 3 log reduction), after the food is treated with the cleaning composition. Thus, the available chlorine in the usage composition is typically from about 0.5 ppm to about 50 ppm, preferably from about 1 ppm to about 30 ppm, more preferably from about 1 ppm to about 10 ppm, and even more preferably from about 2 ppm to about 5 ppm, by weight of the usage composition.

Peroxygen Bleach

Hydrogen peroxide sources are described in detail in Kirk Othmer's Encyclopedia of Chemical Technology, 4th Ed (1992, John Wiley & Sons), Vol. 4, pp. 271–300 "Bleaching Agents (Survey)", incorporated herein by reference, and include the various forms of sodium perborate and sodium percarbonate, including various coated and modified forms.

More generally a source of hydrogen peroxide herein is any convenient compound or mixture which under consumer use conditions provides an effective amount of hydrogen peroxide. The term "effective amount" as herein defined means a level sufficient to reduce the number of viable microorganisms about one thousand times (a 3 log reduction), after the food is treated with the cleaning composition. Levels can vary widely, depending on the type of oxygen bleach and are usually in the range from about 0.1% to about 70%, more typically from about 0.5% to about 30%, by weight of the concentrated compositions herein. The concentrated composition is diluted with water to yield a solution containing typically from about 5 ppm to about 5000 ppm, preferably from about 10 ppm to about 1000 ppm, more preferably from about 10 ppm to about 500 ppm, and even more preferably from about 20 ppm to about 200 ppm, of available oxygen, by weight of the usage composition.

The preferred source of hydrogen peroxide used herein can be any convenient source, including hydrogen peroxide itself. Hydrogen peroxide can be used in liquid compositions which are maintained in an acid pH. Concentrated solid compositions of this invention preferably comprise inorganic peracid salts, for example, perborate, e.g., sodium perborate (any hydrate but preferably the mono-, and tetrahydrate), sodium carbonate peroxyhydrate or equivalent percarbonate salts, sodium pyrophosphate peroxyhydrate, urea peroxyhydrate, or sodium peroxide. Also useful as a source of available oxygen is persulfate bleach (e.g., Oxone®, manufactured by DuPont). Sodium perborate monohydrate and sodium percarbonate are particularly preferred. Mixtures of any convenient hydrogen peroxide sources can also be used. Although giving a purple colored solution, permanganate salts such as potassium permanganate (KMnO4) and sodium permanganate (NaMnO$_4$.3H$_2$O) are very water soluble, and are suitable bleaching agents for use in the compositions and methods of the present invention.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate and/or water-soluble surfactant. Percarbonate is available from various commercial sources such as FMC, Solvay and Tokai Denka.

The present invention compositions and methods can include a metal-containing bleach catalyst and/or a bleach activator that are effective for use with peroxygen bleach compositions.

3. Antimicrobial Active

Solubilized, water soluble antimicrobial actives are useful in the compositions of the present invention to provide the sanitization and/or germicidal benefit. It is preferable to use a broad spectrum antimicrobial active, e.g., one that is effective on both bacteria (both gram positive and gram negative) and fungi. A limited spectrum antimicrobial active, e.g., one that is only effective on a single group of microorganisms, can be used in combination with a broad spectrum antimicrobial active or other limited spectrum antimicrobial actives with complimentary and/or supplementary activity. A mixture of broad spectrum antimicrobial actives can also be used. In some cases where a specific group of microbial contaminants is problematic (such as Gram negatives), aminocarboxylate chelators can be used alone or as potentiators in conjunction with other antimicrobial actives. These chelators which include, e.g., ethylenediaminetetraacetic acid (EDTA), hydroxyethylenediaminetriacetic acid, diethylenetriaminepentaacetic acid, and other aminocarboxylate chelators, and mixtures thereof, and/or their salts, and mixtures thereof, can increase antibacterial effectiveness against Gram-negative bacteria, especially Pseudomonas species, as disclosed hereinafter.

Preferred antimicrobial actives are those that are water-soluble and which are effective at low levels so as not to leave a significant amount on the treated food. Water-soluble antimicrobial actives useful in the present invention are those that have a solubility in water at least at and effective amount, typically at least of about 0.01 g per 100 ml of water, i.e., greater than about 0.01% at room temperature, preferably greater than about 0.03% at room temperature. These types of antimicrobial actives which are soluble in water, when used at low levels, will substantially remain in the wash water, and will not substantially deposit on the treated food. I.e., when the excess treatment solution is removed, most of the active is also removed.

The water-soluble antimicrobial active in the present invention is included at an effective amount. The term "effective amount" as herein defined means a level sufficient to reduce the number of viable microorganisms about one thousand times (a 3 log reduction), after the food is treated with the cleaning composition. Preferred levels of antimicrobial active are from about 0.0001% to about 0.5%, more preferably from about 0.0002% to about 0.2%, most preferably from about 0.0003% to about 0.1%, by weight of the usage composition.

The antibacterial active can be any organic antibacterial materials which are food compatible, e.g., suitable for direct or indirect food contact use or which can be petitioned for food use. The preferred antibacterials are those which are food compatible, e.g., suitable for direct or indirect food contact use and/or which can be approved as GRAS, prior sanctioned, or subject to GRAS approval via a GRAS petition, for example, a new chemical developed for this invention. Preferred water-soluble antibacterial actives include organic acids (e.g., decanoic acid, octanoic acid, lactic acid, and the like), organic sulfur compounds, quaternary salts, (e.g., di-n-alkyl ($C_{8-10}$) dimethylammonium chloride, n-alkyl ($C_{12-16}$) benzyl-dimethylammonium chloride, and other quaternary actives), phenyl and phenolic compounds (e.g., ortho-phenylphenol, ortho-benzyl-para-chlorophenol, para-tertiaryamylphenol, and the like), biguanides (e.g., chlorhexidine); and mixtures thereof.

The following are non-limiting examples of preferred water-soluble antimicrobial actives for use in the present invention.

Organic Acids. Medium chain fatty acids, such as decanoic acid and octanoic acid, and/or their salts, are effective antimicrobial actives and useful in the compositions of the present invention. Some other organic acids such as lactic acid, citric acid, and the like, and/or their water soluble salts, are also effective antimicrobials, useful in the compositions of the present invention. Organic acids and/or their water soluble salts are typically present at a level of from about 0.001% to about 0.2%, preferably from about 0.002% to about 0.1%, and more preferably from about 0.005% to about 0.05%, by weight of the usage composition.

Organic Sulfur Compounds. Organic sulfur antimicrobial compounds are also useful in the compositions of the present invention. Some non-limiting examples of organic sulfur compounds suitable for use in the present invention are: 1,2-benzisothiazolin-3-one, available under the trade name Proxel® products; and 2-methyl-4,5-trimethylene4-isothiazolin-3-one, available under the trade name Promexal®. Both Proxel and Promexal are available from Zeneca. They have stability over a wide pH range (i.e., 4–12). Neither contain active halogen and are not formaldehyde releasing antibacterial actives. Both Proxel and Promexal are effective against typical Gram negative and positive bacteria, fungi and yeasts when used at a level from about 0.001% to about 0.5%, preferably from about 0.005% to about 0.05%, and most preferably from about 0.01% to about 0.02% by weight of the usage composition.

Quaternary Compounds. A wide range of quaternary compounds can also be used as antimicrobial actives in the compositions of the present invention. Non-limiting examples of useful quaternary compounds include: (1) benzalkonium chlorides and/or substituted benzalkonium chlorides such as commercially available Barquat® (available from Lonza), Maquat® (available from Mason), Variquat® (available from Witco/Sherex), and Hyamine® (available from Lonza); (2) dialkyl quaternary such as Bardac® products of Lonza, (3) N-(3-chloroallyl) hexaminium chlorides such as Dowicide® and Dowicil® available from Dow; (4) benzethonium chloride such as Hyamine® 1622 from Rohm & Haas; (5) methylbenzethonium chloride represented by Hyamine® 10x supplied by Rohm & Haas, (6) cetylpyridinium chloride such as Cepacol chloride available from of Merrell Labs. Typical concentrations for biocidal effectiveness of these quaternary compounds range from about 0.001% to about 0.8%, preferably from about 0.005% to about 0.3%, more preferably from about 0.01% to 0.2%, by weight of the usage composition. The corresponding concentrations for the concentrated compositions are from about 0.003% to about 2%, preferably from about 0.006% to about 1.2%, and more preferably from about 0.1% to about 0.8% by weight of the concentrated compositions.

Phenyl and Phenolic Compounds

Some non-limiting examples of phenyl and phenolic compounds suitable for use in the present invention are: ortho-phenylphenol, ortho-benzyl-para-chlorophenol, para-tertiaryamylphenol, benzyl alcohol, 2-phenylethanol, 2-phenoxyethanol, and the like. Typical effective level of these phenolic compounds, and phenyl and phenoxy alcohols, is from about 0.01% to about 0.5%, by weight of the usage composition.

Biguanides. Some of the more robust antimicrobial halogenated compounds which can function as disinfectants/sanitizers as well as finished product preservatives, and which are useful in the compositions of the present invention include 1,1'-hexamethylene bis(5-(p-chlorophenyl) biguanide), commonly known as chlorhexidine, and its salts, e.g., with hydrochloric, acetic and/or gluconic acids. The digluconate salt is highly water-soluble, about 70% in water, and the diacetate salt has a solubility of about 1.8% in water. When chlorhexidine is used as a sanitizer in the present invention it is typically present at a level of from about 0.001% to about 0.4%, preferably from about 0.002% to about 0.3%, and more preferably from about 0.05% to about 0.2%, by weight of the usage composition. In some cases, a level of from about 1% to about 2% may be needed for virucidal activity.

Other useful biguanide compounds include Cosmoci® CQ®, Vantocil® IB, including poly (hexamethylene biguanide) hydrochloride. Other useful cationic antimicrobial agents include the bis-biguanide alkanes. Usable water soluble salts of the above are chlorides, bromides, sulfates, alkyl sulfonates such as methyl sulfonate and ethyl sulfonate, phenylsulfonates such as p-methylphenyl sulfonates, nitrates, acetates, gluconates, and the like.

Examples of suitable bis biguanide compounds are chlorhexidine; 1,6-bis-(2-ethylhexylbiguanidohexane) dihydrochloride; 1,6-di-($N_1$,$N_1$'-phenyldiguanido-$N_5$,$N_5$')-hexane tetrahydrochloride; 1,6-di-($N_1$,$N_1$'-phenyl-$N_1$,$N_1$'methyldiguanido-$N_5$,$N_5$')-hexane dihydrochloride; 1,6-di($N_1$,$N_1$'-o-chlorophenyldiguanido-$N_5$,$N_5$')-hexane dihydrochloride; 1,6-di($N_1$,$N_1$'-2,6-dichlorophenyldiguanido-$N_5$,$N_5$')hexane dihydrochloride; 1,6-di[,$N_1$'-.beta.-(p-methoxyphenyl) diguanido-$N_5$,$N_5$']-hexane dihydrochloride; 1,6-di($N_1$,$N_1$'-.alpha.-methyl-.beta.-phenyldiguanido-$N_5$$N_5$')-hexane dihydrochloride; 1,6-di($N_1$,$N_1$'-p-nitrophenyldiguanido-$N_5$,$N_5$')hexane dihydrochloride;.omega.:.omega.'-di-($N_1$,$N_1$'-phenyldiguanido-$N_5$,$N_5$')-di-n-propylether dihydrochloride;.omega:omega'-di($N_1$,$N_1$'-p-chlorophenyldiguanido-$N_5$,$N_5$')-di-n-propylether tetrahydrochloride; 1,6-di($N_1$,$N_1$'-2,4-dichlorophenyldiguanido-$N_5$,$N_5$')hexane tetrahydrochloride; 1,6-di($N_1$,$N_1$'-p-methylphenyldiguanido-$N_5$,$N_5$')hexane dihydrochloride; 1,6-di($N_1$,$N_1$'-2,4,5-trichlorophenyldiguanido-$N_5$,$N_5$) hexane tetrahydrochloride; 1,6-di[$N_1$,$N_1$'-.alpha.-(p-chlorophenyl) ethyldiguanido-$N_5$,$N_5$'] hexane dihydrochloride;.omega.:.omega.'di($N_1$,$N_1$'-chlorophenyldiguanido-$N_5$,$N_5$')m-xylene dihydrochloride; 1,12-di($N_1$,$N_1$'-p-chlorophenyldiguanido-$N_5$,$N_5$') dodecane dihydrochloride; 1,10-di($N_1$,$N_1$'-phenyldiguanido-$N_5$,$N_5$')-decane tetrahydrochloride; 1,12-di($N_1$,$N_1$'-phenyldiguanido-$N_5$,$N_5$') dodecane tetrahydrochloride; 1,6-di($N_1$,$N_1$'-o-chlorophenyldiguanido-$N_5$,$N_5$') hexane dihydrochloride; 1,6-di($N_1$,$N_1$'-p-chlorophenyldiguanido-$N_5$,$N_5$')-hexane tetrahydrochloride; ethylene bis (1-tolyl biguanide); ethylene bis (p-tolyl biguanide); ethylene bis(3,5-dimethylphenyl biguanide); ethylene bis(p-tert-amylphenyl biguanide); ethylene bis(nonylphenyl biguanide); ethylene bis (phenyl biguanide); ethylene bis (N-butylphenyl biguanide); ethylene bis (2,5-diethoxyphenyl biguanide); ethylene bis(2,4-dimethylphenyl biguanide); ethylene bis(o-diphenylbiguanide); ethylene bis(mixed amyl naphthyl biguanide); N-butyl ethylene bis(phenylbiguanide); trimethylene bis(o-tolyl biguanide); N-butyl trimethylene bis (phenyl biguanide); and the corresponding pharmaceutically acceptable salts of all of the above such as the acetates; gluconates; hydrochlorides; hydrobromides; citrates; bisulfites; fluorides; polymaleates; N-coconutalkylsarcosinates; phosphites; hypophosphites; perfluorooctanoates; silicates; sorbates; salicylates; maleates; tartrates; fumarates; ethylenediaminetetraacetates; iminodiacetates; cinnamates; thiocyanates; arginates; pyromellitates; tetracarboxybutyrates; benzoates; glutarates; monofluorophosphates; and perfluoropropionates, and mixtures thereof. Preferred antimicrobials from this group are 1,6-di-($_1$,$N_1$'-phenyldiguanido-$N_5$,$N_5$')-hexane tetrahydrochloride; 1,6-di($N_1$,$N_1$'-o-chlorophenyldiguanido-$N_5$,$N_5$')-hexane dihydrochloride; 1,6-di($N_1$,$N_1$ '-2,6-dichlorophenyldiguanido-$N_5$,$N_5$')hexane dihydrochloride; 1,6-di($_1$,$N_1$'-2,4-dichlorophenyldiguanido-$N_5$,$N_5$')hexane tetrahydrochloride; 1,6-di[$N_1$,$N_1$'-.alpha.-(p-chlorophenyl) ethyldiguanido-$N_5$,$N_5$'] hexane dihydrochloride;.omega.:.omega.'di($N_1$,$N_1$'-p-chlorophenyldiguanido-$N_5$,$N_5$')m-xylene dihydrochloride; 1,12-di($N_1$,$N_1$'-p-chlorophenyldiguanido-$N_5$,$N_5$') dodecane dihydrochloride; 1,6-di($N_1$,$N_1$'-o-chlorophenyldiguanido-$N_5$,$N_5$') hexane dihydrochloride; 1,6-di($N_1$,$N_1$'-p-chlorophenyldiguanido-$N_5$,$N_5$')-hexane tetrahydrochloride; and mixtures thereof; more preferably, 1,6-di($_1$,$N_1$'-o-chlorophenyldiguanido-$N_5$,$N_5$')-hexane dihydrochloride; 1,6-di($N_1$,$N_1$'-2,6-dichlorophenyldiguanido-$N_5$,$N_5$')hexane dihydrochloride; 1,6-di($N_1$,$N_1$'-2,4-dichlorophenyldiguanido-$N_5$,$N_5$')hexane tetrahydrochloride; 1,6-di[$N_1$,$N_1$'-.alpha.-(p-chlorophenyl) ethyldiguanido-$N_5$,$N_5$'] hexane dihydrochloride;.omega.:.omega.'di($N_1$, $N_1$'-p-chlorophenyldiguanido-$N_5$,$N_5$')m-xylene dihydrochloride; 1,12-di($N_1$,$N_1$'-p-chlorophenyldiguanido-$N_5$,$N_5$') dodecane dihydrochloride; 1,6-di($N_1,N_1$'-o-chlorophenyldiguanido-$N_5,N_5$') hexane dihydrochloride; 1,6-di($N_1,N_1$'-p-chlorophenyldiguanido-$N_5,N_5$')-hexane tetrahydrochloride; and mixtures thereof As stated hereinbefore, the bis biguanide of choice is chlorhexidine its salts, e.g., digluconate, dihydrochloride, diacetate, and mixtures thereof.

The solubilized, water-soluble antimicrobial active, can also be useful in providing protection against organisms that become attached to food, food preparation surfaces and/or food containers. The antimicrobial should be cyclodextrin compatible, e.g., not substantially forming complexes with the cyclodextrin in the food cleaning composition, when cyclodextrin is present. The free, uncomplexed antimicrobial, e.g., antibacterial, active provides optimum antibacterial performance. The preferred antibacterials are those which are food compatible, e.g., suitable for direct or indirect food contact use and/or which can be approved as GRAS, prior sanctioned, or subject to GRAS approval via a GRAS petition, for example, a new chemical developed for this invention.

Sanitization of food and/or food preparation and/or contact surfaces can be achieved by the compositions of the present invention containing antimicrobial materials, e.g., antibacterial halogenated compounds, quaternary compounds, and phenolic compounds.

B. Nonsubstantive Perfume

The food cleaning composition of the present invention comprises an effective amount of a suitable food compatible non-substantive perfume to provide a "scent signal" in the form of a pleasant odor, to signal the removal of undesirable materials from food. The scent signal is provided by a food compatible non-substantive perfume to provide a fleeting perfume scent. The perfume is designed so that it will not deposit and/or linger noticeably on food surfaces. The perfume is also designed, when actives like hypochlorite bleach, or other odoriferous active, are present, their objectionable odor is at least partially concealed. Preferably the nonsubstantive perfume composition provides a fruity odor. When perfume is added as a scent signal, it is added only at very low levels, e.g., from about 0% to about 0.5%, preferably from about 0.003% to about 0.3%, more preferably from about 0.005% to about 0.2%, by weight of the usage composition.

Preferably, the nonsubstantive perfume is composed predominantly of ingredients selected from two groups of perfume ingredients, namely, (a) hydrophilic perfume ingredients having a ClogP (as defined herein below) of less than about 3.5, preferably less than about 3.2, more preferably less than about 3.0, and (b) volatile perfume ingredients having a boiling point (B.P.), determined at the normal, standard pressure of about 760 mm Hg, of about 260° C. or lower, preferably less than about 255° C.; and more preferably less than about 250° C., and (c)mixtures thereof. Typically, at least about 50%, preferably at least about 60%, more preferably at least about 70%, and most preferably at least about 80% by weight of the perfume is composed of perfume ingredients of the above groups (a) and (b).

(a). Hydrophilic Perfume Ingredients

The hydrophilic perfume ingredients are more soluble in water, thus tend to remain in the food cleaning solution and have less of a tendency to deposit on food and do not leave a high level of residue on the food surfaces which can be hydrophobic surfaces. The degree of hydrophobicity of a perfume ingredient can be correlated with its octanol/water partition coefficient P. The octanol/water partition coefficient of a perfume ingredient is the ratio between its equilibrium concentration in octanol and in water. A perfume ingredient with a greater partition coefficient P is considered to be more hydrophobic. Conversely, a perfume ingredient with a smaller partition coefficient P is considered to be more hydrophilic. Since the partition coefficients of the perfume ingredients normally have high values, they are more conveniently given in the form of their logarithm to the base 10, logP. Thus the preferred perfume hydrophilic perfume ingredients of this invention have logP of about 3.5 or smaller, preferably of about 3.2 or smaller, and more preferably of about 3.0 or smaller The logP of many perfume ingredients has been reported; for example, the Pomona92 database, available from Daylight Chemical Information Systems, Inc. (Daylight CIS), Irvine, Calif., contains many, along with citations to the original literature. However, the logP values are most conveniently calculated by the Pamona Med Chem/Daylight "CLOGP" program, available from Biobyte Corporation, Claremont, Calif. This program also lists experimental logP values when they are available in the Pomona92 database. The "calculated logP" (ClogP) is determined by the fragment approach of Hansch and Leo ( cf., A. Leo, in Comprehensive Medicinal Chemistry, Vol. 4, C. Hansch, P. G. Sammens, J. B. Taylor and C. A. Ramsden, Eds., p. 295, Pergamon Press, 1990, incorporated herein by reference). The fragment approach is based on the chemical structure of each perfume ingredient, and takes into account the numbers and types of atoms, the atom connectivity, and chemical bonding. The ClogP values, which are the most reliable and widely used estimates for this physicochemical property, are preferably used instead of the experimental logP values in the selection of perfume ingredients which are useful in the present invention.

Non-limiting examples of the more preferred hydrophilic perfume ingredients are allyl amyl glycolate, allyl caproate, amyl acetate, amyl propionate, anisic aldehyde, anisyl acetate, anisole, benzaldehyde, benzyl acetate, benzyl acetone, benzyl alcohol, benzyl formate, benzyl iso valerate, benzyl propionate, beta gamma hexenol, calone, camphor gum, laevo-carveol, d-carvone, laevo-carvone, cinnamic alcohol, cinnamyl acetate, cinnamic alcohol, cinnamyl formate, cinnamyl propionate, cis-jasmone, cis-3-hexenyl acetate, coumarin, cuminic alcohol, cuminic aldehyde, Cyclal C, cyclogalbanate, dihydroeuginol, dihydro isojasmonate, dimethyl benzyl carbinol, dimethyl benzyl carbinyl acetate, ethyl acetate, ethyl aceto acetate, ethyl amyl ketone, ethyl anthranilate, ethyl benzoate, ethyl butyrate, ethyl cinnamate, ethyl hexyl ketone, ethyl maltol, ethyl-2-methyl butyrate, ethyl methylphenyl glycidate, ethyl phenyl acetate, ethyl salicylate, ethyl vanillin, eucalyptol, eugenol, eugenyl acetate, eugenyl formate, eugenyl methyl ether, fenchyl alcohol, flor acetate (tricyclo decenyl acetate), fructone, frutene (tricyclo decenyl propionate), geraniol, geranyl oxyacetaldehyde, heliotropin, hexenol, hexenyl acetate, hexyl acetate, hexyl formate, hinokitiol, hydratropic alcohol, hydroxycitronellal, hydroxycitronellal diethyl acetal, hydroxycitronellol, indole, isoamyl alcohol, iso cyclo citral, isoeugenol, isoeugenyl acetate, isomenthone, isopulegyl acetate, isoquinoline, keone, ligustral, linalool, linalool oxide, linalyl formate, lyral, menthone, methyl acetophenone, methyl amyl ketone, methyl anthranilate, methyl benzoate, methyl benzyl acetate, methyl cinnamate, methyl dihydrojasmonate, methyl eugenol, methyl heptenone, methyl heptine carbonate, methyl heptyl ketone, methyl hexyl ketone, methyl isobutenyl tetrahydropyran, methyl-N-methyl anthranilate, methyl beta naphthyl ketone, methyl phenyl carbinyl acetate, methyl salicylate, nerol, nonalactone, octalactone, octyl alcohol (octanol-2), para-anisic aldehyde, para-cresol, para-cresyl methyl ether, para hydroxy phenyl butanone, para-methoxy acetophenone, para-methyl acetophenone, phenoxy ethanol, phenoxy ethyl isobutyrate, phenoxyethyl propionate, phenyl acetaldehyde, phenylacetaldehyde diethyl ether, phenylethyl oxyacetaldehyde, phenyl ethyl acetate, phenyl ethyl alcohol, phenyl ethyl dimethyl carbinol, prenyl acetate, propyl butyrate, pulegone, rose oxide, safrole, terpineol, vanillin, viridine, and mixtures thereof.

Nonlimiting examples of other preferred hydrophilic perfume ingredients which can be used in perfume compositions of this invention are allyl heptoate, amyl benzoate, anethole, benzophenone, carvacrol, citral, citronellol, citronellyl nitrile, cyclohexyl ethyl acetate, cymal, 4-decenal, dihydro isojasmonate, ethyl methyl phenyl glycidate, fenchyl acetate, florhydral, gamma-nonalactone, geranyl formate, geranyl nitrile, hexenyl isobutyrate, alpha-ionone, isobornyl acetate, isobutyl benzoate, isomenthol, para-isopropyl phenylacetaldehyde, isopulegol, linalyl acetate, 2-methoxy naphthalene, menthyl acetate, methyl chavicol, musk ketone, beta naphthol methyl ether, neral, nonyl aldehyde, phenyl heptanol, phenyl hexanol, terpinyl acetate, Veratrol, yara-yara, and mixtures thereof.

(b) Volatile Perfume Ingredients

A volatile perfume ingredient is characterized by its boiling point (B.P.). Volatile perfume is not substantive and is substantially lost by evaporation after the treated food is removal from the cleaning solution. The preferred volatile perfume ingredients of this invention have a B.P., determined at the normal, standard pressure of about 760 mm Hg, of about 260° C. or lower, preferably less than about 255° C.; and more preferably less than about 250° C. Boiling points of many perfume compounds can be found, e.g., in the following sources: (a) Properties of Organic Compounds Database CD-ROM, CRC Press, Boca Raton, Fla., (b) Flavor and Fragrance, Aldrich Chemical Co., Milwaukee, Wis., (c) STN database/on-line, Design Institute of for Physical Property Data, American Institute of Chemical Engineers, (d) STN database/on-line, Beilstein Handbook of Organic Chemistry, Beilstein Information Systems, and (e) Perfume and Flavor Chemicals, Steffen Arctander, 1969. When unreported, the boiling points at normal pressure (760 mm) of perfume ingredients can be estimated. Examples of computer programs which are useful for estimating these boilings points are PBPVP Version 1.25 (c) 1994–96 Meylan, Syracuse Research Corporation (SRC), Syracuse, N.Y., and ZPARC. ChemLogic, Inc., Cambridge, Mass.

Nonlimiting examples of the preferred volatile perfume ingredients useful in the present invention are allo-ocimene, allyl cyclohexanepropionate, allyl heptanoate, trans-anethole, benzyl butyrate, camphene, cadinene, carvacrol, cis-3-hexenyl tiglate, citronellol, citronellyl acetate, citronellyl nitrile, citronellyl propionate, cyclohexylethyl acetate, decyl aldehyde (capraldehyde), dihydromyrcenol, dihydromyrcenyl acetate, 3,7-dimethyl-l-octanol, diphenyloxide, fenchyl acetate (1,3,3-trimethyl-2-norbornanyl acetate), geranyl acetate, geranyl formate, geranyl nitrile, cis-3-hexenyl isobutyrate, hexyl neopentanoate, hexyl tiglate, alpha-ionone, isobornyl acetate, isobutyl benzoate, isononyl acetate, isononyl alcohol (3,5,5-trimethyl-1-hexanol), isopulegyl acetate, lauraldehyde, d-limonene, linalyl acetate, (–)-1-menthyl acetate, methyl chavicol (estragole), methyl n-nonyl acetaldehyde, methyl octyl acetaldehyde, beta-myrcene, neryl acetate, nonyl acetate, nonaldehyde, p-cymene, alpha-pinene, beta-pinene, alpha-terpinene, gamma-terpinene, alpha-terpinyl acetate, tetrahydrolinalool, tetrahydromyrcenol, 2-undecenal, verdox (o-t-butylcyclohexyl acetate), vertenex (4-tert.butylcyclohexyl acetate). Other preferred volatile perfume ingredients are also hydrophilic ingredients (many are already listed hereinabove), for example, allyl caproate, amyl acetate (n-pentyl acetate), amyl propionate, p-anisaldehyde anisole, benzaldehyde, benzyl acetate, benzylacetone benzyl alcohol, benzyl formate, benzyl isovalerate, benzyl propionate, beta-gamma-hexenol (2-hexen-1-ol), camphor, carvone, cinnamic alcohol, cinnamyl formate, cis-jasmone, cis-3-hexenyl acetate, citral (neral), cumic alcohol, cuminaldehyde, cyclal (2,4-dimethyl-3-cyclohexene-1-carboxaldehyde), dimethyl benzyl carbinol, dimethyl benzyl carbinyl acetate, ethyl acetate, ethyl acetoacetate, ethyl amyl ketone, ethyl benzoate, ethyl butanoate, 3-nonanone (ethyl hexyl ketone), ethyl phenylacetate, eucalyptol, eugenol, fenchyl alcohol, flor acetate (tricyclodecenyl acetate), frutene (tricyclodecenyl propionate), gamma-nonalactone, geraniol, cis-3-hexen-1-ol (leaf alcohol), hexyl acetate, hexyl formate, hydratopic alcohol, hydroxycitronellal, indole (2,3-benzopyrrole), isoamyl alcohol, isopropyl phenylacetate, isopulegol, isoquinoline (benzopyridine), ligustral (2,4-dimethyl-3-cyclohexene-1-carboxaldehyde), linalool, linalool oxide, linalyl formate, menthone, 4-methylacetophenone, methyl pentyl ketone, methyl anthranilate, methyl benzoate, methyl phenyl carbinyl acetate (alpha-methylbenzyl acetate), methyl eugenol (eugenyl methyl ether), methyl heptenone (6-methyl-5-hepten-2-one), methyl heptine carbonate (methyl 2-octynoate), methyl heptyl ketone. methyl hexyl ketone, methyl salicylate, dimethyl anthranilate, nerol, delta-nonalactone, gamma-octalactone, 2-octanol, octyl aldehyde (caprylic aldehyde), p-cresol, p-cresyl methyl ether, acetanisole, 2-phenoxyethanol, phenylacetaldehyde, 2-phenylethyl acetate, phenethyl alcohol, phenyl ethyl dimethyl carbinol (benzyl-tert-butanol), prenyl acetate, propyl butanoate, pulegone, rose oxide, safrole, 4-terpinenol, terpinolene (alpha-terpineol), veratrole (1,2-dimethoxybenzene), viridine (phenylacetaldehyde dimethyl acetal).

The preferred perfume compositions used in the present invention contain more than one, e.g., at least 4 different nonsubstantive perfume ingredients, preferably at least 5 different nonsubstantive perfume ingredients, more preferably at least 6 different nonsubstantive perfume ingredients, and even more preferably at least 7 different nonsubstantive perfume ingredients. Most common perfume ingredients which are derived from natural sources are composed of a multitude of components. When each such material is used in the formulation of the preferred perfume compositions of the present invention, it is counted as one single ingredient, for the purpose of defining the invention. However, some fruity perfume compositions of natural sources, such as orange oil, grape fruit oil, and the like, can also be used as is, without further combining with other perfume ingredients.

Substantive perfume ingredients, which should be minimized in the food cleaning detergent compositions of the present invention, are those having a B.P. of more than about 260° C. and a ClogP greater than about 3.5, such as ambrettolide (oxacycloheptadec-10-en-2-one), amyl benzoate (n-pentyl benzoate), isoamyl cinnamate, alpha-amylcinnamaldehyde, alpha-amylcinnamaldehyde (dimethyl acetal), iso-amyl salicylate (isopentyl salicylate), aurantiol (methyl anthranilate/hydroxycitronellal Schiff base), benzyl salicylate, beta-caryophyllene, cedrol, cedryl acetate, cinnamyl cinnamate, citronellyl isobutyrate, cyclohexyl salicylate, cyclamen aldehyde, delta-dodecalactone, dihydro isojasmonate (methyl 2-hexyl-3-oxo-cyclopentanecarboxylate), diphenylmethane, ethylene brassylate, ethyl undecylenate, iso E super, exaltolide (pentadecanolide), galaxolide (4,6,6,7,8,8-hexamethyl-1,3,4,6,7,8-hexahydro-cyclopenta(G)-2-benzopyran, gamma-methyl ionone (alpha-isomethylionone), geranyl isobutyrate, hexadecanolide, cis-3-hexenyl salicylate, alpha-hexylcinnamaldehyde, n-hexyl salicylate, alpha-irone, 6-isobutylquinoline, lilial (p-tert.butyl-alpha-methyldihydrocinnamic aldehyde, pt bucinol), linalyl benzoate, beta-naphthyl methyl ether(2-methoxy naphthalene), 10-oxahexadecanolide, patchouli alcohol, phantolide (acetyl-1,1,2,3,3,6-hexamethylindan), phenethyl benzoate, phenethyl phenylacetate, tonalid (7-acetyl-1,1,3,4,4,6-hexamethyltetralin), delta-undecalactone, gamma-undecalactone, vertinert acetate. In some particular food cleaning compositions, some substantive perfume ingredients can be used in small amounts, e.g., less than about 40%, preferably less than about 30%, more preferably less than about 20%, by weight of the perfume composition, e.g., to improve product odor and/or perfume odor character.

The perfumes suitable for use in the food cleaning composition can be formulated from known food compatible perfume ingredients, the perfume is preferably substantially free of halogenated fragrance materials and nitromusks.

In the perfume art, some auxiliary materials having no odor, or a low odor, are used, e.g., as solvents, diluents, extenders or fixatives. Non-limiting examples of these materials are ethyl alcohol, carbitol, dipropylene glycol, diethyl phthalate, triethyl citrate, isopropyl myristate, and benzyl benzoate. These materials are used for, e.g., solubilizing, or diluting, some solid or viscous perfume ingredients to, e.g., improve handling and/or formulating. These materials are useful in the nonsubstantive perfume compositions, but are not counted in the calculation of the limits for the definition/formulation of the nonsubstantive perfume compositions of the present invention.

Optional Protective Perfume Carrier

Optionally, but preferably, the concentrated solid food cleaning compositions of this invention comprises all or part of the perfume in the form of food compatible, moisture-activated encapsulated perfume particles. The encapsulated particles act as- protective carriers and reduce the loss of perfume prior to use. Encapsulation of perfume minimizes the loss of perfume, especially the volatile perfume ingredients. The perfume loss occurs due to evaporation and/or chemical reaction with the bleaching agent when it is present. Furthermore, when present, some solid bleaching agents are a fire risk if in contact with liquid organic materials. Solid perfume encapsulates, e.g., microcapsules, that do not rupture readily are thus a preferred approach to provide the pleasant odor signal. Such solid encapsulated particles include, for example, cyclodextrin/perfume inclusion complexes, polysaccharide cellular matrix perfume microcapsules, and the like. Perfume is released when the materials are wetted, to provide a pleasant odor signal in use. Especially preferred are cyclodextrin inclusion complexes.

The optional water-activated protective perfume carriers are very useful in the present invention. They allow the use of lower level of perfume in the solid powder cleaning composition because of the reduced loss of the perfume during manufacturing, storage and use of the solid concentrated food cleaning composition.

Optionally, but preferably, compositions that contain encapsulated and/or complexed perfume also comprise free perfume in order to provide consumers with a positive scent signal before the composition is used.

a. Cyclodextrin

As used herein, the term "cyclodextrin" includes any of the known cyclodextrins such as unsubstituted cyclodextrins containing from six to twelve glucose units, especially, alpha-, beta-, and gamma-cyclodextrins, and/or their derivatives, and/or mixtures thereof, especially food compatible cyclodextrins. The alpha-cyclodextrin consists of 6, the beta-cyclodextrin 7, and the gamma-cyclodextrin 8, glucose units arranged in a donut-shaped ring. The specific coupling and conformation of the glucose units give the cyclodextrins a rigid, conical molecular structure with a hollow interior of a specific volume. The "lining" of the internal cavity is formed by hydrogen atoms and glycosidic bridging oxygen atoms, therefore this surface is fairly hydrophobic. These cavities can be filled with all or a portion of an organic molecule with suitable size to form an "inclusion complex." Alpha-, beta-, and gamma-cyclodextrins can be obtained from, among others, American Maize-Products Company (Amaizo), Hammond, Ind.

The preferred cyclodextrin is beta-cyclodextrin. It is also desirable to use mixtures of cyclodextrins. Preferably at least a major portion of the cyclodextrins are alpha-, beta- and/or gamma-cyclodextrins, more preferably alpha- and beta-cyclodextrins. Some cyclodextrin mixtures are commercially available from, e.g., Ensuiko Sugar Refining Company, Yokohama, Japan.

Derivatives of cyclodextrins can also be used to form water-activated perfume complexes which are useful in the food cleaning compositions of the present invention. Cyclodextrin derivatives consist mainly of cyclodextrin molecules wherein some of the OH groups are converted to OR groups. Cyclodextrin derivatives include, e.g., those with short chain alkyl groups such as methylated cyclodextrins, and ethylated cyclodextrins, wherein R is a methyl or an ethyl group; those with hydroxyalkyl substituted groups, such as hydroxypropyl cyclodextrins and/or hydroxyethyl cyclodextrins, wherein R is a —$CH_2$—CH(OH)—$CH_3$ or a —$CH_2CH_2$—OH group; branched cyclodextrins such as maltose-bonded cyclodextrins; cationic cyclodextrins such as those containing 2-hydroxy-3-(dimethylamino)propyl ether, wherein R is $CH_2$—CH(OH)—$CH_2$—N($CH_3$)$_2$ which is cationic at low pH; quaternary ammonium, e.g., 2-hydroxy-3-(trimethylammonio)propyl ether chloride groups, wherein R is $CH_2$—CH(OH)—$CH_2$—N$^+$($CH_3$)$_3$Cl$^-$; anionic cyclodextrins such as carboxymethyl cyclodextrins, cyclodextrin sulfates, and cyclodextrin succinylates; amphoteric cyclodextrins such as carboxymethyl/quaternary ammonium cyclodextrins; cyclodextrins wherein two hydroxyl groups of at least one glucopyranose unit are connected by a bridging group (such as an oxygen atom forming a 3-6-anhydro-cyclomalto structure, e.g., the mono-3-6-anhydrocyclodextrins, as disclosed in "Optimal Performances with Minimal Chemical Modification of Cyclodextrins", F. Diedaini-Pilard and B. Perly, The 7th International Cyclodextrin Symposium Abstracts, April 1994, p. 49, or a glycerol bridging group, as disclosed in "Synthesis of Cyclodextrin Glycerol Ethers and Investigation of Their Binding Properties", M Masson, J. Pitha and T. Loftsson, The 9th International Cyclodextrin Symposium Abstracts, June 1998, p. 2-P-20, said references being incorporated herein by reference); and mixtures thereof Examples of other cyclodextrin derivatives are disclosed in U.S. Pat. Nos: 3,426,011, Parmerter et al., issued Feb. 4, 1969; U.S. Pat. Nos. 3,453,257, 3,453,258, 3,453,259, and 3,453,260, all in the names of Parmerter et al., and all also issued Jul. 1, 1969; U.S. Pat. No. 3,459,731, Gramera et al., issued Aug. 5, 1969; U.S. Pat. No. 3,553,191, Parmerter et al., issued Jan. 5, 1971; U.S. Pat. No. 3,565,887, Parmerter et al., issued Feb. 23, 1971; U.S. Pat. No. 4,535,152, Szejtli et al., issued Aug. 13, 1985; U.S. Pat. No. 4,616,008, Hirai et al., issued Oct. 7, 1986; U.S. Pat. No. 4,638,058, Brandt et al., issued Jan. 20, 1987; U.S. Pat. No. 4,746,734, Tsuchiyama et al., issued May 24, 1988; and U.S. Pat. No. 4,678,598, Ogino et al., issued Jul. 7, 1987, all of said patents being incorporated herein by reference. Examples of cyclodextrin derivatives suitable for use herein are methyl-beta-cyclodextrin, hydroxyethyl-beta-cyclodextrin, and hydroxypropyl-beta-cyclodextrin of different degrees of substitution (D.S.), available from Amaizo; Wacker Chemicals (USA), Inc.; and Aldrich Chemical Company.

b. Formation of Cyclodextrin/Perfume Inclusion Complexes

The perfume/cyclodextrin inclusion complexes of this invention are formed in any of the ways known in the art. Typically, the complexes are formed either by bringing the perfume and the cyclodextrin together in a suitable solvent, e.g., water, or, preferably, by kneading/slurrying the ingredients together in the presence of a suitable, preferably minimal, amount of solvent, preferably water. The kneading/slurrying method (including via an extruder) is particularly desirable because it produces smaller complex particles and requires the use of less solvent, eliminating or reducing the need to further reduce particle size and separate excess solvent. Disclosures of complex formation can be found in Atwood, J. L., J. E. D. Davies & D. D. MacNichol, (Ed.): *Inclusion Compounds.* Vol. III, Academic Press (1984), especially Chapter 11, Atwood, J. L. and J. E. D. Davies (Ed.): *Proceedings of the Second International Symposium of Cyclodextrins* Tokyo, Japan, (July, 1984), and J. Szejtli, *Cyclodextrin Technology,* Kluwer Academic Publishers (1988), said publications being incorporated herein by reference.

In general, perfume/cyclodextrin complexes have a molar ratio of perfume compound to cyclodextrin of about 1:1. However, the molar ratio can be either higher or lower, depending on the size of the perfume compound and the identity of the cyclodextrin compound. The molar ratio can be determined by forming a saturated solution of the cyclodextrin and adding the perfume to form the complex. In general the complex will precipitate readily. If not, the complex can usually be precipitated by the addition of electrolyte, change of pH, cooling, etc. The complex can then be analyzed to determine the ratio of perfume to cyclodextrin.

As stated hereinbefore, the actual complexes are determined by the size of the cavity in the cyclodextrin and the size of the perfume molecule. Desirable complexes can be formed using mixtures of cyclodextrins since perfumes are normally mixtures of materials that vary widely in size. It is usually desirable that at least a majority of the material be alpha-, beta-, and/or gamma-cyclodextrin, more preferably beta-cyclodextrin. The content of the perfume in the beta-cyclodextrin complex is typically from about 5% to about 15%, more normally from about 7% to about 12%.

Continuous complexation operations usually involve the use of supersaturated solutions, kneading/slurrying/extrusion method, and/or temperature manipulation, e.g., heating and then either cooling, freeze-drying, etc. The complexes are dried to a dry powder to make the desired composition. In general, the fewest possible process steps are preferred to avoid loss of perfume. In industrial complexation processes, such as the use of an extruder, the complexation reaction may not be complete, with some uncomplexed cyclodextrin still remaining, after the perfume/cyclodextrin complex powder has been dried. Desirably, the complex powder contains less than about 20% of free cyclodextrin, preferably less than 15% of free cyclodextrin, more preferably less than about 10% of free cyclodextrin, and even more preferably less than about 5% of free cyclodextrin, by weight of the total cyclodextrin in the composition.

Cyclodextrin/perfume complex powder of any particle size can be used, but preferably having a particle size of less than about 12 microns, more preferably of less than about 8 microns.

c. Matrix Perfume Microcapsules

Water-activated, preferably water-soluble, food compatible cellular matrix perfume microcapsules are solid particles containing perfume stably held in the cells. The water-activated matrix material comprises mainly polysaccharide and polyhydroxy compounds. The polysaccharides are preferably higher polysaccharides of the non-sweet, colloidally-soluble types, such as natural gums, e.g., gum arabic, starch derivatives, dextrinized and hydrolyzed starches, and the like. The polyhydroxy compounds are preferably alcohols, plant-type sugars, lactones, monoethers, and acetals. The cellular matrix microcapsules useful in the present invention are prepared by, e.g., (1) forming an aqueous phase of the polysaccharide and polyhydroxy compound in proper proportions, with added emulsifier if necessary or desirable; (2) emulsifying the perfumes in the aqueous phase; and (3) removing moisture while the mass is plastic or flowable, e.g., by spray drying droplets of the emulsion. The matrix materials and process details are disclosed in, e.g., U.S. Pat. No. 3,971,852, Brenner et al., issued Jul. 27, 1976, which is incorporated herein by reference.

The present invention preferably has minimal non-encapsulated surface perfume, preferably less than about 1%.

Moisture-activated perfume microcapsules can be obtained commercially, e.g., as IN-CAP® from Polak's Frutal Works, Inc., Middletown, N.Y.; and as Optilok System® encapsulated perfumes from Encapsulated Technology, Inc., Nyack, N.Y.

Water-soluble matrix perfume microcapsules preferably have sizes of from about 0.5 micron to about 300 microns, more preferably from about 1 micron to about 200 microns, and most preferably from about 2 microns to about 100 microns.

C. Optional Detergent Surfactant

Synthetic Anionic Surfactant - Base stable anionic surfactants can be employed, e.g., as allowed in the United States by the United States Code of Federal Regulations (CFR), Title 21, Section 173.315. Specific mention is made of salts of dodecylbenzene sulfonate, typically at levels up to 0.2%. Also described in the CFR are phosphate esters of ethylene and/or ethylene/propylene oxide adducts of aliphatic alcohols, dioctyl sulfosuccinate, and 2-ethylhexyl sulfate.

The anionic surfactant is preferably selected from materials known in the art, such as $C_{6-18}$, preferably $C_{6-14}$ alkyl sulfates and/or sulfonates; $C_{6-15}$, preferably $C_{6-14}$ alkylbenzene sulfonates; di-$C_{6-10}$ alkyl sulfosuccinates, etc., and mixtures thereof. The alkyl sulfates are preferred, for antimicrobial effectiveness and palatability, especially as the sodium and/or potassium salts. Potassium $C_{8-14}$ soaps are also preferred. Mixtures of such alkyl sulfates and soaps are also preferred.

Nonionic Surfactant—Nonionic surfactants, when used, are preferably selected from materials known in the art, such as alkylene oxide (ethylene oxide and/or propylene oxide)

adducts of $C_{10-18}$ aliphatic alcohols or acids, $C_{10-18}$ aliphatic alcohol adducts of glucose (alkyl polyglucosides). The specific nonionic surfactant selected ideally has a hydrophilic-lipophilic balance (HLB) greater than about 10, and a cloud point above about 35° C. in the composition. The United States Code of Federal Regulations (CFR) specifically describes an ethylene oxide/propylene oxide adduct of $C_{12-18}$ aliphatic alcohol of molecular weight of about 800. Such a material is available as Plurafac® RA-20 (BASF).

In compositions containing soap, the nonionic detergent surfactants, e.g., alkoxylated alcohol, functions mainly as a dispersant for any soap curd which may form during the cleansing operation. Further, it is recognized that the selection of non-nitrogen containing nonionics can minimize the possibility of microbial growth in the dilute surfactant compositions.

Fatty Salts—The compositions herein can contain soap, especially $C_{6-18}$, preferably $C_{8-14}$, soap like coconut fatty acid middle cut soap. Lauric acid is convenient for this use. Oleate soaps are desirable, including, especially, potassium oleate, which is more water soluble. Specific solubilizing surfactants in higher proportions can be used to solubilize these soaps. However, soaps should not be used in large quantities because of taste considerations.

Cyclodextrin Compatible Surfactants

When free, uncomplexed cyclodextrin is present in the composition, it is preferably to use a cyclodextrin compatible surfactant. A cyclodextrin compatible surfactant does not substantially form a complex with the cyclodextrin so as to diminish performance of the cyclodextrin and/or the surfactant when cyclodextrin is present. Complex formation diminishes both the ability of the cyclodextrin to absorb odors and the ability of the surfactant to lower the surface tension of the aqueous composition. Nonlimiting examples of cyclodextrin-compatible nonionic surfactants include block copolymers of ethylene oxide and propylene oxide, and silicone polyethers. Nonlimiting example of suitable block polyoxyethylene-polyoxypropylene polymeric surfactants are those designated Pluronic® and Tetronic® by the BASF-Wyandotte Corp., Wyandotte, Mich. Useful silicone polymeric surfactants are the polyoxyalkylene polysiloxanes having a dimethyl polysiloxane hydrophobic moiety and one or more hydrophilic polyoxyalkylene side chains. Nonlimiting examples of this type of surfactants are the Silwet® surfactants which are available from OSi Specialties, Inc., Danbury, Conn.

The presence of the detergent surfactant is important, primarily for reduction of the surface tension and viscosity. It is highly desirable that the dilute treatment compositions have a low viscosity, typically less than about 50, preferably less than about 10, and more preferably less than about 5. The low viscosity improves the completeness of the treatment by promoting spreading over the surface of the food, especially where there are layers, rugosities, etc. The low viscosity also improves drainage, thus providing at least some soil removal. Low viscosity also improves speed of drying, if that is desired. Thus, the detergent surfactant provides highly important advantages in terms of treatment.

The detergent surfactant also improves antimicrobial action. The presence of the surfactant, and especially the alkyl sulfate, provides improved kill and/or rate of kill.

It is important that the detergent surfactant not affect palatability. Accordingly, the level should be low. As discussed before, soap is not usually used in large amounts because of taste considerations and food grade surfactants are highly desirable for taste considerations.

D. Sequestrant/Builder

The optional, but preferred, sequestrant and/or builder herein is polyphosphate salt or organic polycarboxylic salt, e.g., sodium and/or potassium citrate, and/or sodium and/or potassium ethylenediaminetetraacetate, and mixtures thereof, which are standard items of commerce and are GRAS. Other organic polycarboxylic acids, especially those that are GRAS, such as citric, tartaric, malic, etc. acids, and mixtures thereof, can also be used. A preferred version of polyphosphate is an anhydrous Fast Dissolving STPP manufactured by the FMC corporation. Complex phosphates can also be used, and are highly useful to maintain the clarity of dilute solutions made from hard water, but are generally avoided due to regulatory considerations where phosphate levels are specifically forbidden or highly restricted. Citrate builders, e.g., and soluble salts thereof (particularly sodium salt), are preferred polycarboxylate builders due to their availability from renewable resources and their biodegradability. Typically, the sequestrant/builder is present at a level of from about 0.0005% to about 3%, preferably from about 0.005% to about 0.5%, and more preferably from about 0.01% to about 0.2%, by weight of the dilute, usage composition. Sequestrant/builders can maintain the efficacy of the formulas in the presence of hardness.

E. Uncomplexed Cyclodextrin

The free, uncomplexed cyclodextrin can be any of the cyclodextrins described hereinbefore with respect to the cyclodextrin/perfume complexes which are food compatible. Preferably, the free, uncomplexed cyclodextrins used in the present invention are highly water-soluble such as, alpha-cyclodextrin and/or derivatives thereof, gamma-cyclodextrin and/or derivatives thereof, derivatised beta-cyclodextrins, and/or mixtures thereof.

F. Antimicrobial Preservative

Formulating the present concentrated compositions at high pH reduces the tendency for biological growth of contaminants, such as bacteria, fungi, or molds. However, preservatives can help insure the lack of biological growth through contamination in making or in use. Standard food-grade preservatives such as ethylenediaminetetraacetic acid and/or the salts thereof, at a level of from about 0.01% to about 0.2% of ethylenediaminetetraacetic acid, or its sodium and/or potassium salts, can be used although, in general, the basic pH compositions herein do not require a preservative. Other organic or inorganic antibacterial actives given hereinbefore can also serve as preservatives when present, or can be added at low and effective levels as preservatives.

G. Suds Suppressor

At low levels, suds suppressors or antifoamers can be used, especially in the case where a certain surfactant level is desired for wetting and/or efficacy, but the degree of foam generated in the washing of food is desired to be kept low. The amount of suds suppressor can be tailored in conjunction with the type and level of surfactant used. Preferred suds suppressors include silicones and their derivatives. Preferably food grade suds supressors are used, with DC4270 and DC2-4242 from Dow Corning being useful suds suppressors. Some polyoxyalkylene polysiloxane silicone surfactants and polyoxyethylene-polyoxypropylene block copolymeric surfactants having low content of oxyethylene monomers, typically leat than about 20%, preferably less than 15%, can function as suds suppressors. Typically suds suppressor is present at a level of from about 0.001% to about 1%, preferably from about 0.01% to about 0.5%, more preferably from about 0.05% to about 0.2%, by weight of the usage composition.

Polyethylene glycols (PEG) can be used as a carrier or binder material for a silicone suds suppressor particle in dry powder concentrate formulas. Typically PEG molecular weights are such that the PEG is a solid at room temperature to contain the silicone. A preferred M.W. in this case is 8000. In the case where PEG is an integral part of the carrier for silicone in a power concentrate, caution should be used in the processing of the material to avoid excessive shearing of the dry product. PEG can be soft enough that excessive shear could alter the integrity of the particle formed with it.

H. Fluid Carrier

The major proportion, e.g., more than about two thirds, (typically, approximately 80%–99.7%, by weight) of the dilute (e.g., usage or treatment) compositions herein comprises water as the solubilizing carrier for the ingredients. As noted in the Examples hereinafter, water-ethanol can also be employed and is especially preferred when formulating the basic pH compositions herein. The ethanol level in the dilute composition preferably should not exceed 2% in the solution used to treat the produce, to avoid an alcoholic odor. Other compatible, water-soluble, low molecular weight solvents such as glycerol can also be used. Glycerol can also be used in solid compositions to minimize fines. It is an advantage of this invention, that one can use impure water to prepare the dilute composition, the microorganisms being killed by the, food compatible sanitizer, e.g., high pH and/or surfactant and/or builder. As used herein, "impure water" is water that is impure by reason of microorganisms being present.

1. Filler Materials

Depending on whether a greater or lesser degree of compactness is required, filler materials can also be present in the concentrated granular solid food cleaning composition of the present invention. These include, e.g., sucrose, sucrose esters, sodium sulfate, potassium sulfate, and the like, and mixtures thereof. Since key actives of the food cleaning compositions, viz., sanitizer (e.g., bleach, antimicrobials) and perfume, are effective at low levels, fillers can be used at fairly high levels, in amounts of up to 90%, preferably from 0% to about 70% by weight of the concentrated solid composition. Preferred filler is food compatible sodium sulfate, preferably in good grades having at most low levels of trace impurities. Sodium sulfate used herein preferably has a purity sufficient to ensure it is non-reactive with bleach when bleach is present.

Since the food cleaning compositions herein can contain water-sensitive ingredients or ingredients which can co-react when brought together in an aqueous environment, it is desirable to keep the free moisture content of the concentrated solid food cleaning composition at a minimum, e.g., 10% or less, preferably 5% or less, by weight of the concentrated food cleaning composition; and to provide packaging which is substantially impermeable to water. Plastic bottles, including refillable or recyclable types, as well as conventional barrier cartons or boxes are another helpful means of assuring maximum shelf-storage stability.

J. Optional Ingredients

Polyethylene Glycol—The water-soluble polyethylene glycol polymer (PEG) which can be employed herein is the known article of commerce and is available under a variety of trade names, of which CARBOWAX (Union Carbide Corporation) is exemplary. PEG's in the average molecular weight range of from about 200 to about 20,000 can be used herein, and PEG as CARBOWAX in the average molecular weight range of at least about 200, typically 300 to about 9500, is convenient and preferred. The dilute compositions herein can comprise at least about 0.001%, by weight, of the PEG and will typically comprise from about 0.005% to about 0.1%, by weight, of PEG. The amounts used can vary with the molecular weight of the PEG, the amount of surfactant used in the composition, the desired viscosity of the composition, and like factors within the discretion of the formulator.

In a typical mode, the preferred compositions herein that have an improved tactile impression will comprise surfactant/PEG weight ratios in the range from about 1:2 to about 30:1, preferably from about 1:1 to about 15:1.

The compositions herein which contain the polyethylene glycol are characterized not only by their excellent cleaning performance and sudsing/rinsability properties, but also by their improved "feel". The improved feel of the compositions which come into contact with the users' hands is a qualitative tactile impression. However, this improved, "non-slippery", "non-soapy" improvement in skin feel can be demonstrated by rubbing Test (PEG-containing) and Control (no PEG) compositions on the hands or inner forearms of volunteer graders. Even in such rudimentary tests, the graders can readily distinguish the improved tactile impression of the compositions.

Antioxidants The use of surfactants, and especially soaps, can be complicated by development of off-odors and/or yellowing of the compositions in which they appear. These undesirable properties are believed to be caused by complex side reactions initiated by the reaction of oxygen with primarily the polyunsaturated components of the fatty acid stock. These results can be avoided, or minimized, by avoiding contact with air, or by controlling the quality of the fatty acid stock so that the amount and type of polyunsaturates are minimized as described above, and/or by the addition of chelants and/or antioxidants.

It has been found, that the addition of tocopherols (e.g., Vitamin E, or tocopherol acetates) in alkaline formulations is advantageous, as they do not degrade, nor do they impart a strong color. They inhibit the development of off-odors for extended periods of time so that the need for masking scents is minimized, or eliminated, particularly for oleic acid stocks of high quality, as described above. The use of butylated phenols, such as BHT and BHA is also useful, but their effectiveness appears more limited and they can impart stronger colors to the compositions. Other food grade antioxidants such as Vitamin C, sorbates, and sulfites, are desirable to prevent deterioration of the compositions by the action of oxygen, but care must be taken since vitamin C can suffer color degradation and sulfates can cause odor problems. Sulfites also have been the target of potential health concerns.

Method of Use

The concentrated food cleaning compositions herein are preferably used by placing them in a container, such as a pan, with water, preferably pure, to form the dilute, usage compositions and facilitate immersion of the food.

The typical use involves treating individual items of food in a "bath" followed by draining the food and/or drying, to minimize the amount of composition left on the food.

In an optional process for using the dilute, usage compositions described herein, the food product is cleaned, rubbed, and/or wiped off with a suitable cleaning implement such as cloth, sponge, a paper towel, and the like, which contains said usage composition.

In another optional, but highly useful, process, potentially impure water is treated with the concentrated composition to kill microorganisms and this "treated" water is used to rinse food that has been treated with the dilute treatment composition in another vessel. This protects against the undetected gradual contamination of the original treatment composition. The "rinse" composition can contain lower levels of the concentrate, since all that is needed is to kill the microorganisms in the water itself.

The compositions and processes described herein can provide effective disinfectancy/sanitization. In order to provide good kill of microorganisms, especially bacteria, one should use high concentrations and/or longer exposure times. Typically, the dilute compositions should be used full strength and allowed to remain on the food for at least about one half minute, preferably at least about one minute, and even more preferably at least about five minutes, and, for some microorganisms, even ten minutes may be required. Longer exposure times (i.e., the time that the bacteria are in contact with the product) give better antimicrobial benefits.

For compositions containing a basic buffer, the importance of time depends both on the pH of the product and on the formula concentration. At high pH ($\geq 11.5$) and high concentrations, antibacterial efficacy is achieved quickly. At lower pH values (pH$\leq 11.0$) and lower formula concentrations, a longer period of exposure time is required to achieve the same efficacy. Higher pHs are also better, in general.

Similarly, dilute, usage solution of the food cleaning composition containing a sanitizing active, such as bleach or antibacterial active, higher active levels and/or longer soaking time improve antibacterial effectiveness. However, it is important to use only enough active to provide effective performance, but not so much as to cause an off-odor or taste to the treated food.

The methods herein can comprise forming the dilute treatment composition using either (a) pure and/or (b) impure water and then either (1) not rinsing so that any removal is by mechanical means, e.g., evaporation, absorption, and/or draining; (2) rinsing with pure water if it is available; and/or (3) treating impure water with the dilute treatment composition to create "pure" rinse water and then rinsing.

Food

All kinds of foods can be treated. Examples include: produce, including fruits and vegetables such as apples, grapes, peaches, potatoes, lettuce, tomatoes, celery, and the like, that are to be eaten after treatment without cooking to kill microorganisms, and edible animal protein, especially meat, seafood and poultry, including foodstuffs which are comprised essentially of the protein found in such foods sources including, but not limited to, beef, pork, chicken, turkey, fish, shellfish and game meats such as venison, rabbit and the like. Said edible animal protein includes the processed forms of said protein sources, including, but not limited to, such forms as ground beef, ground turkey, bologna, hot dogs, sausages, fish cakes, and the like. The food is preferably ready to eat after treatment, and is eaten shortly thereafter to minimize recontamination.

The compositions can also be used for cleaning (especially spot removal), disinfectancy, or sanitization, on non-food (i.e., any surface which is not used as food, even those which are not in contact with food), inanimate, household surfaces, especially those used in food production and other food-contacting surfaces (surfaces that come in contact with food),e.g., cutting boards, counter tops, utensils, dishes, colanders, sinks, sponges, towels, dish cloths, cloth napkins (serviettes), table cloths, and other surfaces that come in contact with food. It is desirable to disinfect/sanitize before the surfaces come in contact with the food, and is desirable to redisinfect/sanitize whenever the surfaces become recontaminated. The products herein, containing all GRAS and/or food compatible ingredients, are highly suitable for this purpose. On hard surfaces, of course, the compositions can be removed, after sufficient time has elapsed, by rinsing if pure water is available, or by absorption/wiping with an appropriate implement, e.g., paper towel, sponge, squeegee, etc.

The compositions of this invention can also be used to treat/clean other non-food inanimate household surfaces, such as fabrics, e.g., clothing, shoes, and shower curtains, especially those that are used by infants, especially toys, diapers (napkins), and bibs that may be licked, or placed in the mouth. The contaminated fabrics can be disinfected/sanitized, then allowed to drain and/or dry, to minimize the risk of infection, while minimizing the risk from the sanitizing active if the infant puts the fabric or other article in its mouth. However, it is desirable to rinse fabrics, at least, with water that contains less active and/or alkalinity. The fabric can be treated totally, or by spot treatment, then the composition is preferably removed, at least partially, e.g., by evaporation, draining, absorbency, and/or mechanical force.

Packaging the products herein in a container with instructions for usage in terms of timing and proper dilution in order to provide disinfectancy/sanitization, will help the individual consumer by providing information for proper dilution and/or usage in order to remove/kill microorganisms. It is a special advantage of the product that it can be used for this purpose at a time in the food production process where recontamination is minimized. The instructions desirably provide assurance that rinsing is not needed in order to avoid possible recontamination by rinsing with impure water.

For fabrics, the pH of the compositions is preferably below about 11.5, more preferably below 11.0.

For fabrics and hard surfaces, the distribution of the compositions of this invention can be achieved by using a spray device, a roller, a pad, etc., or dipping in a "bath" of said compositions. Spraying is a preferred method.

All parts, percentages, and ratios herein are "by weight" unless otherwise stated. All number values are approximate unless otherwise stated. All patents, books, and other publications mentioned herein are incorporated, in relevant part, by reference.

The following Examples illustrate the compositions and processes of this invention, but are not intended to be limiting thereof. The exemplified basic liquid dilute treatment compositions can be prepared at pH 10.5–13 by dissolving the concentrated liquid or solid powder compositions, or the individual ingredients, in water or water-ethanol using conventional mixing apparatus. In a convenient mode, e.g., the concentrate of Example I, water is placed in a treatment vessel. Potassium hydroxide, the dipotassium ortho-phosphate, the disodium EDTA, ethanol, and the surfactant (lauric acid) are added in the named sequence, with stirring. Non-substantive Perfume A can be added any time after the surfactant has been dissolved in the mixture.

Bacteria kill efficacy of the usage composition of the present invention is determined by a standard AOAC germicidal and detergent sanitizing test. Test organisms *E. coli,* ATCC 11229, or *Staphylococcus aureus,* ATCC 6538, are prepared in an inoculum with a 5% organic soil load (horse serum) prepared with French culture bottles to achieve higher cfu/ml. The test exposure temperature is 25° C. and incubation time for survivor count is 48–54 hours at 35° C.

EXAMPLES

The following are examples of the instant composition.

Illustrative examples of perfume compositions to be used in the following Examples are as follows:

| Ingredients | Weight % |
| --- | --- |
| Perfume A Citrus Fruity Lemon | |
| Allo ocimene | 0.5 |
| Allyl amyl glycolate | 1.0 |
| Allyl caproate | 2.0 |
| Allyl cyclohexane propionate | 1.0 |
| Alpha pinene | 4.0 |
| Beta pinene | 3.0 |
| Camphene | 0.5 |
| Camphor gum | 1.3 |
| Cis jasmone | 0.2 |
| Citral | 6.8 |
| Citronellal nitrile | 1.5 |
| Cyclal C | 0.5 |
| Decyl aldehyde | 1.5 |
| Dihydro myrcenol | 4.5 |
| Fructone | 4.6 |
| Geraniol | 4.0 |
| Geranyl nitrile | 5.0 |
| Hydroxycitronellal | 2.0 |
| Iso bornyl acetate | 4.6 |
| Iso cyclo citral | 7.0 |
| Iso jasmone | 0.4 |
| Laevo carvone | 0.6 |
| Limonene | 3.0 |
| Linalool | 6.0 |
| Lyral | 5.0 |
| Methyl anthranilate | 1.5 |
| Methyl beta-naphthyl ketone | 5.0 |
| Methyl dihydro jasmonate | 4.0 |
| Methyl heptenone | 0.3 |
| Methyl iso butenyl tetrahydro pyran | 0.5 |
| Octyl alcohol | 1.0 |
| Orange terpenes | 10.6 |
| Phenyl ethyl alcohol | 2.1 |
| Terpineol | 4.0 |
| Vaniliin | 0.5 |
| Total | 100.0 |
| Perfume B - Citrus Lime | |
| Benzyl propionate | 2.0 |
| Citral | 3.0 |
| Citronellyl nitrile | 2.0 |
| Para-cymene | 1.5 |
| Decyl aldehyde | 0.5 |
| Dihydro myrcinol | 10.0 |
| Eucalyptol | 2.0 |
| Fenchyl alcohol | 0.5 |
| Flor acetate | 7.0 |
| Frutene | 5.0 |
| Geranyl nitrile | 3.0 |
| cis-3-Hexyl tiglate | 0.5 |
| Linalool | 7.0 |
| Linalyl acetate | 5.0 |
| d-Limonene | 30.0 |
| Methyl dihydro jasmonate | 5.0 |
| Octyl aldehyde | 0.5 |
| Phenyl hexanol | 5.0 |
| Alpha-pinene | 2.5 |
| 4-Terpineol | 2.0 |
| Terpinyl acetate | 2.0 |
| Tetrahydro linalool | 3.0 |
| Verdox | 1.0 |
| Total | 100.0 |
| Perfume C - Citrus Floral | |
| Amyl Salicylate | 1.0 |
| Anisic aldehyde | 1.0 |
| PT-Bucinal | 5.0 |
| Citronellol | 5.0 |
| Citral | 4.0 |
| Citronellyl nitrile | 3.0 |
| para-Cymene | 2.0 |
| Decyl aldehyde | 1.0 |
| Dihydro myrcenol | 15.0 |
| Geranyl nitrile | 5.0 |
| beta-gamma-Hexenol | 0.3 |
| cis-3-Hexenyl Acetate | 0.2 |
| Hexyl Cinnamic Aldehyde | 5.0 |
| Hexyl Salicylate | 3.0 |
| alpha-Ionone | 2.0 |
| cis-Jasmone | 1.0 |
| d-Limonene | 15.0 |
| Linalool | 8.0 |
| Linalyl acetate | 5.0 |
| beta-Myrcene | 1.5 |
| Nerol | 3.0 |
| Patchouli alcohol | 1.0 |
| Phenyl hexanol | 3.0 |
| alpha-Pinene | 3.0 |
| beta-Pinene | 3.0 |
| 4-Terpineol | 4.0 |
| Total | 100 |
| Perfume D - Fruity Pineapple | |
| Acetate tcd (conf.-firm) | 0.5 |
| Allo ocimene | 0.5 |
| Allyl amyl glycolate | 3.0 |
| Allyl caproate | 5.0 |
| Allyl cyclohexane propionate | 5.0 |
| Allyl heptoate | 5.0 |
| Anisic aldehyde | 1.0 |
| Benzyl acetate | 2.0 |
| Benzyl propionate | 3.0 |
| Beta gamma hexenol | 0.4 |
| Camphene | 0.5 |
| Cinnamic alcohol | 2.0 |
| Cis jasmone | 0.3 |
| Citronellal nitrile | 2.0 |
| Dimethyl benzyl carbinyl acetate | 3.0 |
| Ethyl acetoacetate | 5.0 |
| Ethyl butyrate | 1.0 |
| Ethyl methyl phenyl glycidate | 3.0 |
| Ethyl phenyl acetate | 3.0 |
| Ethyl vanillin | 0.1 |
| Flor acetate | 9.6 |
| Fructone | 10.0 |
| Frutene | 6.0 |
| Geraniol | 3.0 |
| Geranyl butyrate | 2.0 |
| Heliotropin | 2.0 |
| Hydroxycitronellal | 1.0 |
| Indol | 0.1 |
| Linalool | 5.0 |
| Methyl anthranilate | 5.0 |
| Orange tetpenes | 3.0 |
| Para hydroxy phenyl butanone | 1.0 |
| Phenyl ethyl alcohol | 7.0 |
| Total | 100.0 |
| Perfume E - Plum | |
| 2 - Methyl butyric acid | 1.0 |
| Allo ocimene | 0.5 |
| Benzyl acetate | 7.5 |
| Cis-3 hexenol 10% DPG | 2.0 |
| Cis-3-hexenyl formate | 0.5 |
| Citronellal nitrile | 3.0 |
| Damascenone | 0.5 |
| Delta decalactone | 4.5 |
| Delta nonalactone | 2.0 |
| Delta octalactone | 2.0 |
| Dimethyl benzyl carbinol | 4.0 |
| Dimethyl benzyl carbinyl butyrate | 8.0 |
| Dodecalactone | 1.0 |

-continued

| Ingredients | Weight % |
|---|---|
| Ethyl caproate | 1.5 |
| Gamma Dodecen-6-lactone | 1.0 |
| Geraniol | 14.0 |
| Geranyl acetate | 2.0 |
| Geranyl butyrate | 1.0 |
| Ionone gamma methyl | 2.0 |
| Linalool | 22.0 |
| Linalool oxide | 2.0 |
| Methyl anthranilate | 3.0 |
| Methyl dihydro jasmonate | 0.5 |
| Methyl eugenol | 6.0 |
| Orange terpenes | 8.0 |
| Vanillin | 0.5 |
| Total | 100.0 |
| Perfume F - Raspberry | |
| 2-methyl pentanoic acid | 1.2 |
| Allo ocimene | 0.5 |
| Allyl cyclohexane propionate | 1.0 |
| Amyl acetate | 4.0 |
| Berizyl acetate | 31.0 |
| Cis 3 hexenyl acetate | 0.8 |
| Cis-3-hexenol | 0.8 |
| Citral | 1.0 |
| Citronellal nitrile | 2.0 |
| Citronellyl propionate | 1.0 |
| Coumarin | 1.0 |
| Delta decalactone | 1.2 |
| Dimethyl anthranilate | 0.8 |
| Dimethyl benzyl carbinol | 1.9 |
| Ethyl acetate | 2.0 |
| Ethyl butyrate | 4.0 |
| Ethyl caproate | 0.8 |
| Ethyl methyl phenyl glycidate | 6.4 |
| Ethyl methyl butyrate | 2.0 |
| Ethyl vanillin | 0.1 |
| Hexyl tiglate | 0.5 |
| Hydroquinone dimethyl ether | 1.0 |
| Iso eugenol | 1.0 |
| Linalool | 18.0 |
| Menthone racemic | 0.7 |
| Methyl anthranilate | 4.0 |
| Methyl heptenone | 0.1 |
| Nonalactone | 2.0 |
| Orange terpenes | 4.0 |
| Para cresyl methyl ether | 0.1 |
| Para hydroxy phenyl butanone | 3.0 |
| Undecavertol | 0.9 |
| Vanillin | 1.2 |
| Total | 100.0 |
| Perfume G - Strawberry | |
| Allyl cyclohexane propionate | 2.0 |
| Allyl heptoate | 1.0 |
| Benzyl acetate | 2.0 |
| Benzyl alcohol | 49.0 |
| Cinnamic alcohol | 1.0 |
| Cinnamic aldehyde | 0.3 |
| Cis 3 hexenol | 3.0 |
| Cis 3 hexenyl formate | 0.1 |
| Citral | 1.0 |
| Delta decalactone | 1.0 |
| Ethyl acetate | 2.5 |
| Ethyl acetoacetate | 2.5 |
| Ethyl butyrate | 13.0 |
| Ethyl maltol | 1.0 |
| Ethyl methyl butyrate | 4.5 |
| Ethyl methyl phenyl glycidate | 1.0 |
| Ethyl propyl ketone | 4.0 |
| Geranyl acetate | 1.5 |
| Geranyl butyrate | 1.0 |
| Hexyl tiglate | 0.5 |
| Maltol isobutyrate | 0.5 |
| Methyl cinnamate | 3.0 |
| Methyl heptenone | 0.1 |

-continued

| Ingredients | Weight % |
|---|---|
| Orange terpenes | 3.0 |
| Vanillin | 1.5 |
| Total | 100.00 |

Following are examples of moisture-activated encapsulated perfumes, e.g., cyclodextrin/perfume inclusion complexes and matrix perfume microcapsules, that can be incorporated in the food cleaning compositions of this invention.

Cyclodextrin/Perfume Complex

A mobile slurry is prepared by mixing about 1 Kg of beta-cyclodextrin and about 1 liter of water in a stainless steel mixing bowl of a KitchenAid™ mixer using a plastic coated heavy-duty mixing blade. Mixing is continued while about 170 g of the perfume is slowly added. The liquid-like slurry immediately starts to thicken and becomes a creamy paste. Stirring is continued for about 30 minutes. About 0.5 liter of water is then added to the paste and blended well. Stirring is resumed for about an additional 30 minutes. During this time the complex again thickens, although not to the same degree as before the additional water is added. The resulting creamy complex is spread in a thin layer on a tray and allowed to air dry. This produces about 1.1 Kg of granular solid which is ground to a fine powder. Cyclodextrin/perfume complexes are highly preferred as moisture activated encapsulated perfumes because they remain intact without perfume release/loss in the making, storage, and use of the food cleaning compositions, e.g., in the solid, especially granular form.

Beta-cyclodextrin complexes of non-substantive fruity Perfumes A–G are thus prepared to obtain Perfume Complexes A–G, respectively.

Matrix Perfume Microcapsules

An example of water-activated matrix perfume microcapsules is made according to Example 1 of U.S. Pat. No. 3,971,852, except that 90 parts of non-substantive perfume composition A is used instead of 120 parts of orange oil. Lower perfume loading levels, preferably about 50% or less, more preferably about 40% or less of the maximum disclosed in said patent, are used to minimize the crushing and cracking of the capsules during processing. Capsule rupture can cause perfume leaking and loss, as well as reaction with the bleaching active, when such bleaching active is present in the granular solid food cleaning composition.

Example I

A concentrated liquid composition to be diluted, uses KOH and $K_2HPO_4$ for a alkaline buffer source and potassium laurate derived from neutralized lauric acid as a surfactant.

Example I

| Ingredients | Wt. % |
|---|---|
| DI Water | |
| KOH | 5.9 |

-continued

| Ingredients | Example I Wt. % |
|---|---|
| Lauric acid | 1.95 |
| Ethanol | 1.8 |
| Perfume A | 0.05 |
| $Na_2EDTA.2H_2O$ | 2.93 |
| $K_2HPO_4$ | 26.06 |
| DI Water | Balance |
| pH | ~12.1 |

The usage composition is prepared by diluting the concentrated liquid composition of Example I in tap water (having about 8 grains per gallon hardness) in an amount of about 20 gm of concentrated liquid product into about 1 liter water, resulting in a soak solution with a pH of about 11.5. The soak solution is effective in microbial reduction (e.g., against *E. coli*, after 5 minutes soak). Furthermore, produce washed in the soak solution is determined to have no negative effects in regards to taste or palatability when used without a rinse.

Examples II & III

Concentrated powder compositions to be diluted, have sodium carbonate and/or trisodium phosphate for an alkaline buffer source and sodium lauryl sulfate as a surfactant.

| Ingredients | Example II Wt. % | Example III Wt. % |
|---|---|---|
| Sodium Lauryl Sulfate | 2 | 3.4 |
| Glycerol | 2.5 | — |
| $TSP.12H_2O$ | 92.0 | 70.2 |
| Sodium Carbonate | — | 17 |
| PEG 3350 | 2.3 | 2 |
| Perfume Complex B | 1.2 | — |
| Perfume Complex C | — | 1 |
| Moisture | — | 6.4 |
| Total | 100 | 100 |

Amounts of about 3 and about 5 gm of concentrated powder compositions of Examples II and III respectively are each diluted into approximately 1 liter of tap water, to prepare dilute, usage solutions, both having a pH of about 11.5. Produce washed in these soak solutions are determined to have no negative effects in regards to taste or palatability when consumed without a rinse.

Example IV

A concentrated powder composition to be diluted, uses tripotassium phosphate for alkaline buffer source and sodium LAS as surfactant.

| Ingredients | Example IV Wt. % |
|---|---|
| Sodium LAS | 3.5 |
| Tripotassium phosphate | 92.1 |
| PEG 3350 | 3.4 |
| Perfume Complex D | 1 |
| Total | 100 |

The concentrated powder composition of Example IV is diluted in tap water in the amount of about 6 gm of powder composition into about 1 liter water, to obtain a usage composition for food wash having a pH of about 11.8.

Examples V–VII

The following are concentrated powder compositions containing trisodium phosphate basic buffer, to be diluted with water to form food cleaning solutions.

| Ingredients | Example V Wt.% | Example VI Wt.% | Example VII Wt. % |
|---|---|---|---|
| Trisodium phosphate.$12H_2O$ | 89.3 | 92 | 90.7 |
| Sodium lauryl sulfate | 3.6 | — | — |
| Sodium dodecyl sulfate | — | 3.3 | 5.5 |
| $Na_2EDTA.2H_2O$ | 3 | — | 3.6 |
| Silicone DC-2-4242 suds suppressor | 2 | — | — |
| PEG 3350 | — | 3.5 | — |
| Perfume Complex E | 0.8 | — | — |
| Perfume Complex F | — | 1.2 | — |
| Matrix Perfume Microcapsule G | — | — | 0.2 |
| Glycerol | 1.3 | — | — |
| Total | 100 | 100 | 100 |
| Concentrated powder dilution to make cleaning solution | ~3 gm/liter $H_2O$ | ~3.6 gm/liter $H_2O$ | ~3.7 gm/liter $H_2O$ |
| Cleaning solution pH | ~11.5 | ~11.6 | ~11.6 |

Examples VIII–X

The following concentrated powder compositions are formulated to be diluted with water to form a usage solution, and use polyphosphate salts (trisodium phosphate (TSP) and sodium tripolyphosphate (STPP)) as the alkaline buffer source.

| Ingredients | Example VIII Wt. % | Example IX Wt. % | Example X Wt. % |
|---|---|---|---|
| $TSP.12H_2O$ | 71 | 66.4 | 66.4 |
| STPP | 20 | 18 | 18 |
| Sodium Lauryl Sulfate | 4 | — | — |
| Pluronic P65[a] | — | 3 | 3 |
| Glycerin | 2 | 1 | 1 |
| Silicone-based Antifoam (DC4270) | 1.5 | — | — |
| Hydroxypropyl β-Cyclodextrin | — | 10 | — |
| RAMEB[b] | — | — | 10 |
| Distilled Grapefruit Oil | 0.05 | — | — |
| Perfume Complex A | 0.8 | — | — |

| Ingredients | Example VIII Wt. % | Example IX Wt. % | Example X Wt. % |
|---|---|---|---|
| Perfume Complex B | — | 1 | — |
| Perfume Complex G | — | — | 1 |
| Moisture | 0.6 | 0.6 | 0.6 |
| Total | 100 | 100 | 100 |

(a)Polyoxyethylene/polyoxypropylene block copolymeric surfactant from BASF.
(b)RAMEB= randomly methylated β-cyclodextrin.

Examples XI–XIII

The following concentrated powder compositions, formulated to be diluted, use perborate salt as an oxygen bleach.

| Ingredients | Example XI Wt. % | Example XII Wt.% | Example XIII Wt.% |
|---|---|---|---|
| Sodium citrate | 30 | — | — |
| Sodium carbonate | 15 | 20 | 30.5 |
| STPP | — | 31 | 30 |
| Nonionic surfactant Plurafac™ | 2 | — | — |
| | | 2 | 3 |
| Perborate monohydrate(1) | 14.5 | 14.5 | 20 |
| Dibenzoyl Peroxide(2) | 4.4 | 2.2 | 2.2 |
| Perfume Complex B | 1.2 | — | — |
| Perfume Complex C | — | 1 | — |
| Perfume Complex D | — | — | 0.8 |
| Sodium sulfate and moisture | Balance | Balance | Balance |

(1)About 15.5% active AvO.
(2)About 18% active.

The concentrated powder compositions of Examples XI, XII and XIII are diluted in tap water by adding about 4 gm of powder composition into about 1 liter of water, to obtain usage compositions for food cleaning having an avO of approximately about 90 ppm, 90 ppm and 125 ppm, respectively.

Examples XIV–XV

The following concentrated powder compositions, formulated to be diluted, use perborate salt as an oxygen bleach.

| Ingredients | Example XIV Wt. % | Example XV Wt. % |
|---|---|---|
| Sodium citrate | 30 | — |
| Sodium carbonate | 15 | 20 |
| STPP | — | 31 |
| Pluronic P65 | 3 | 3 |
| Perborate monohydrate(1) | 14.5 | 14.5 |
| Dibenzoyl Peroxide(2) | 4.4 | 2.2 |
| Hydroxypropyl β-Cyclodextrin | 10 | — |
| RAMEB(b) | — | 10 |
| Perfume Complex E | 1.5 | — |
| Perfume Complex F | — | 1.2 |
| Sodium sulfate and moisture | Balance | Balance |

(1)About 15.5% active AvO.
(2)About 18% active.

Examples XVI–XVIII

The following concentrated powder compositions, formulated to be diluted, use a chlorine bleach source.

| Ingredients | Example XVI Wt. % | Example XVII Wt. % | Example XVIII Wt. % |
|---|---|---|---|
| Sodium tripolyphosphate | 40 | 35 | 35 |
| Sodium carbonate | 20 | 20 | 20 |
| Sodium dichlorocyanurate dihydrate(1) | 1 | 1 | 1 |
| Nonionic surfactant(2) | 2.6 | — | — |
| Pluronic P65 | — | 3 | 2 |
| Perfume Complex A | 1 | — | — |
| Perfume Complex B | — | 1.5 | — |
| Perfume Complex C | — | — | 1.5 |
| Sodium sulfate and moisture | Balance | Balance | Balance |

(1)About 1% active AvCl$_2$.
(2)Blend of ethoxylated monohydroxy alcohol and polyoxyethylene/polyoxypropylene block polymer.

The concentrated powder compositions of Examples XVI–XVIII are diluted in tap water by adding about 2–5 gm of powder composition into about 1 liter of water, to obtain usage compositions for food cleaning having avCl$_2$ of approximately about 2–5 ppm, respectively.

Any of the foregoing food cleaning compositions can be used in the manner described in the Method of Use section herein above.

What is claimed is:

1. A composition for treating food, including produce and meat, and/or surfaces that contact food, to make the food safe to eat, optionally after dilution, comprising:

(A) an effective amount of food compatible sanitizer to reduce the level of microorganisms, selected from the group consisting of: (1) basic buffer to provide a pH of from about 10.5 to about 13; (2) water soluble bleach; (3) water soluble antimicrobials; and (4) mixtures thereof;

(B) an effective amount to provide a desirable odor effect of food compatible, non-substantive perfume; wherein at least about 50% of said non-substantive perfume comprises perfume components having a ClogP of less than about 3.5 and/or a boiling point of about 260° C. or lower and said non-substantive perfume has at least four different perfume components having a ClogP of less than about 3.5 and/or a boiling point of about 260° C. or lower;

(C) optionally, sufficient food compatible detergent surfactant to reduce the surface tension and to reduce the viscosity to less than about 50 cp., to help maximize surface wetting and/or drainage thus minimizing residue, but less than an amount that will affect palatability;

(D) optionally, an effective level of calcium ion sequestrant to sequester calcium in hard water to control calcium precipitates;

(E) optionally, food compatible uncomplexed cyclodextrin;

(F) optionally, food compatible preservative;

(G) optionally, food compatible suds suppressor; and (H) the balance comprising diluents; an aqueous carrier selected from water and, optionally, low levels of low molecular weight, food compatible organic solvent; and/or minor ingredients;

said composition being essentially free of any material that is not food compatible.

2. The composition of claim 1 wherein at least about 60% of said non-substantive perfume comprises perfume components having a ClogP of less than about 3.2 and/or a boiling point of about 255° C. or lower and there are at least five different perfume components having a ClogP of less than about 3.5 and/or a boiling point of about 260° C. or lower.

3. The composition of claim 2 wherein at least about 70% of said non-substantive perfume comprises perfume components having a ClogP of less than about 3.2 and/or a boiling point of about 255° C. or lower and there are at least six different perfume components having a ClogP of less than about 3.5 and/or a boiling point of about 260° C. or lower.

4. The composition of claim 3 wherein at least about 80% of said non-substantive perfume comprises perfume components having a ClogP of less than about 3.2 and/or a boiling point of about 255° C. or lower and there are at least seven different perfume components having a ClogP of less than about 3.5 and/or a boiling point of about 260° C. or lower.

5. The composition of claim 1 wherein said perfume ingredients are selected from the group consisting of: allyl amyl glycolate, allyl caproate, amyl acetate, amyl propionate, anisic aldehyde, anisyl acetate, anisole, benzaldehyde, benzyl acetate, benzyl acetone, benzyl alcohol, benzyl formate, benzyl iso valerate, benzyl propionate, beta gamma hexenol, calone, camphor gum, laevo-carveol, d-carvone, laevo-carvone, cinnamic alcohol, cinnamyl acetate, cinnamic alcohol, cinnamyl formate, cinnamyl propionate, cis-jasmone, cis-3-hexenyl acetate, coumarin, cuminic alcohol, cuminic aldehyde, Cyclal C, cyclogalbanate, dihydroeuginol, dihydro isojasmonate, dimethyl benzyl carbinol, dimethyl benzyl carbinyl acetate, ethyl acetate, ethyl aceto acetate, ethyl amyl ketone, ethyl anthranilate, ethyl benzoate, ethyl butyrate, ethyl cinnamate, ethyl hexyl ketone, ethyl maltol, ethyl-2-methyl butyrate, ethyl methylphenyl glycidate, ethyl phenyl acetate, ethyl salicylate, ethyl vanillin, eucalyptol, eugenol, eugenyl acetate, eugenyl formate, eugenyl methyl ether, fenchyl alcohol, flor acetate, fructone, frutene, geraniol, geranyl oxyacetaldehyde, heliotropin, hexenol, hexenyl acetate, hexyl acetate, hexyl formate, hinokitiol, hydratropic alcohol, hydroxycitronellal, hydroxycitronellal diethyl acetal, hydroxycitronellol, indole, isoamyl alcohol, iso cyclo citral, isoeugenol, isoeugenyl acetate, isomenthone, isopulegyl acetate, isoquinoline, keone, ligustral, linalool, linalool oxide, linalyl formate, lyral, menthone, methyl acetophenone, methyl amyl ketone, methyl anthranilate, methyl benzoate, methyl benzyl acetate, methyl cinnamate, methyl dihydrojasmonate, methyl eugenol, methyl heptenone, methyl heptine carbonate, methyl heptyl ketone, methyl hexyl ketone, methyl isobutenyl tetrahydropyran, methyl-N-methyl anthranilate, methyl beta naphthyl ketone, methyl phenyl carbinyl acetate, methyl salicylate, nerol, nonalactone, octalactone, octyl alcohol, para-anisic aldehyde, para-cresol, para-cresyl methyl ether, para hydroxy phenyl butanone, para-methoxy acetophenone, para-methyl acetophenone, phenoxy ethanol, phenoxy ethyl isobutyrate, phenoxyethyl propionate, phenyl acetaldehyde, phenylacetaldehyde diethyl ether, phenylethyl oxyacetaldehyde, phenyl ethyl acetate, phenyl ethyl alcohol, phenyl ethyl dimethyl carbinol, prenyl acetate, propyl butyrate, pulegone, rose oxide, safrole, terpineol, vanillin, viridine, allo-ocimene, allyl cyclohexanepropionate, allyl heptanoate, trans-anethole, benzyl butyrate, camphene, cadinene, carvacrol, cis-3-hexenyl tiglate, citronellol, citronellyl acetate, citronellyl nitrile, citronellyl propionate, cyclohexylethyl acetate, decyl aldehyde (capraldehyde), dihydromyrcenol, dihydromyrcenyl acetate, 3,7-dimethyl-1-octanol, diphenyloxide, fenchyl acetate, geranyl acetate, geranyl formate, geranyl nitrile, cis-3-hexenyl isobutyrate, hexyl neopentanoate, hexyl tiglate, alpha-ionone, isobornyl acetate, isobutyl benzoate, isononyl acetate, isononyl alcohol, isopulegyl acetate, lauraldehyde, d-limonene, linalyl acetate, (-)-1-menthyl acetate, methyl chavicol (estragole), methyl n-nonyl acetaldehyde, methyl octyl acetaldehyde, beta-myrcene, neryl acetate, nonyl acetate, nonaldehyde, p-cymene, alpha-pinene, beta-pinene, alphaterpinene, gamma-terpinene, alpha-terpinyl acetate, tetrahydrolinalool, tetrahydromyrcenol, 2-undecenal, verdox, vertenex, and mixtures thereof.

6. The composition of claim 1 wherein said food compatible sanitizer to reduce the level of microorganisms is water soluble potassium and/or sodium and/or calcium hydroxides, orthophosphates, polyphosphates, carbonates, and/or bicarbonates as said basic buffer to provide a pH of from about 10.9 to about 12.5; said food compatible, nonsubstantive perfume comprises perfume ingredients having either a boiling point of about 260° C. or lower, a ClogP of about 3.5 or lower, or both; said food compatible detergent surfactant reduces the viscosity to less than about 10 cp and is present at a level of less than about 0.5%; and containing from about 0.001% to about 1%, by weight of said calcium ion sequestrant and the balance comprising an aqueous carrier selected from water and, optionally, low levels of low molecular weight, food compatible organic solvent; and/or minor ingredients.

7. The composition of claim 6 which is an aqueous dilute treatment composition having a pH of from about 11.3 to about 12.3 and comprising: toxicologically-acceptable preservative; food compatible suds suppressor; and the aqueous carrier being selected from water and, optionally, a low level of low molecular weight, food compatible organic solvent.

8. A composition according to claim 7 which comprises: food compatible basic buffer selected from the group consisting of water soluble potassium and/or sodium, hydroxides, ortho-phosphates, polyphosphates, and/or carbonates, to provide a pH of from about 10.9 to about 12.5; less than about 0.2% by weight and sufficient to reduce the viscosity of said solution to less than about 5 cp. of food compatible base-stable anionic detergent surfactant; and from about 0.003% to about 0.5% by weight of said calcium ion sequestrant.

9. A composition according to claim 8 wherein said food compatible detergent surfactant is sodium and/or potassium alkyl sulfate and/or $C_{8-18}$ soap.

10. A composition according to claim 1 in concentrated form containing amounts of ingredients (A)–(C) so that after dilution with water to provide a concentration of the composition in water of from about 0.01% to about 5% the ingredients are present at effective levels.

11. The composition of claim 10 in granular form.

12. A composition according to claim 1 in concentrated form containing amounts of ingredients (A)–(C) so that after dilution with water to provide a concentration of the composition in water of from about 0.1% to about 2% the ingredients are present at effective levels.

13. A composition according to claim 1 in concentrated form containing amounts of ingredients (A)–(C) so that after dilution with water to provide a concentration of the composition in water of from about 0.2% to about 1% the ingredients are present at effective levels.

14. A dilute treatment composition prepared by diluting from about 0.01% to about 5% by weight of the composition of claim 1 with impure water to form a composition which has a viscosity less than about 50 centipoise under shear of greater than about 1000 sec$^{-1}$ and effective amounts of ingredients (A)–(C).

15. A composition according to claim 1 comprising only GRAS and/or food compatible ingredients.

16. A method for treating food, including produce and meat, and/or surfaces that come in contact with food, to make the food safer to eat comprising contacting the surface of said food and/or the surfaces in contact with said food, shortly before ingestion of said food, so as to minimize the chances for recontamination, by direct application of a dilute aqueous treatment composition comprising:
   (A) an effective amount of food compatible sanitizer to reduce the level of microorganisms, selected from the group consisting of: (1) basic buffer, to provide a pH of from about 10.5 to about 13; (2) water soluble bleach; (3) water soluble antimicrobials; and (4) mixtures thereof;
   (B) an effective amount to provide odor effects of food compatible, nonsubstantive perfume;
   (C) optionally, sufficient food compatible detergent surfactant to reduce the surface tension and to reduce the viscosity to less than about 50 cp., to help maximize surface wetting and/or drainage thus minimizing residue, but less than an amount that will affect palatability;
   (D) optionally, from about 0.0005% to about 3% by weight of calcium ion sequestrant to sequester calcium in hard water to control calcium precipitates;
   (E) optionally, food compatible uncomplexed cyclodextrin;
   (F) optionally, food compatible preservative;
   (G) optionally, food compatible suds suppressor; and
   (H) the balance comprising diluents; an aqueous carrier selected from water and, optionally, low levels of low molecular weight, food compatible organic solvent such as ethanol, glycerol, etc. and/or minor ingredients; said composition being essentially free of any material that is not food compatible and essentially free of any material that adversely affects safety or palatability, so that said food does not need to be rinsed before consumption, said treatment being for a period of time of at least one half minute, followed by draining and/or drying, said food being then ready for consumption and having desirable palatability.

17. The method of claim 16 wherein said aqueous dilute treatment composition comprises: food compatible basic buffer selected from the group consisting of water soluble potassium and/or sodium and/or calcium hydroxides, ortho-phosphates, polyphosphates, carbonates, and/or bicarbonates, to provide a pH of from about 10.5 to about 13 and a reserve alkalinity of less than about 10; less than about 0.5% by weight of food compatible base-stable anionic detergent surfactant; optionally, from about 0.0005% to about 3% by weight of calcium ion sequestrant selected from the group consisting of water soluble salts of polyphosphates, organic polycarboxylic acid, and mixtures thereof; food compatible preservative;and food compatible suds suppresser.

18. The method of claim 17 wherein said aqueous treatment composition comprises: food compatible basic buffer selected from the group consisting of water soluble potassium and/or sodium, hydroxides, ortho-phosphates, polyphosphates, and/or carbonates, to provide a pH of from about 10.9 to about 12.5 and a reserve alkalinity of less than about 7; less than about 0.2% by weight and sufficient to reduce the viscosity of said solution to less than about 50 cp., of food compatible base-stable anionic detergent surfactant; and optionally, from about 0.001% to about 1% by weight said calcium ion sequestrant, which is selected from the group consisting of sodium and/or tripolyphosphate, ethylenediaminetetraacetate, citrate, and mixtures thereof.

19. The method of claim 17 wherein said aqueous treatment composition comprises: food compatible basic buffer selected from the group consisting of water soluble potassium and/or sodium ortho-phosphates, polyphosphates, and/or carbonates, to provide a pH of from about 11.3 to about 12.3 and a reserve alkalinity of less than about 4; less than about 0.1% by weight and sufficient to reduce the viscosity of said solution to less than about 10 cp., of food compatible base-stable sodium and/or potassium alkyl sulfate and/or $C_{8-18}$ soap; and optionally, from about 0.01% to about 0.5% by weight of salt of organic polycarboxylic acid.

20. The method of claim 17 wherein said aqueous treatment composition comprises: less than about 0.1% by weight and sufficient to reduce the viscosity of said solution to less than about 5 cp., of food compatible base-stable sodium and/or potassium alkyl sulfate and/or $C_{8-18}$ soap; and optionally, from about 0.01% to about 0.2% by weight of sodium ethylenediaminetetraacetate.

21. The method of claim 16 wherein said aqueous treatment composition comprises:
   (a) less than about 0.1% by weight and sufficient to reduce the viscosity of said solution to less than about 5 cp., of food compatible base-stable sodium and/or potassium alkyl sulfate and/or $C_{8-14}$ soap; and
   (b) optionally, from about 0.01% to about 1% by weight of sodium tripolyphosphate.

22. The method of claim 16 wherein said treatment composition is made by diluting a concentrated composition with water containing microorganisms, the concentrate being used at a level of from about 0.01% to about 5% by weight of the dilute aqueous treatment composition.

23. The method of claim 16 wherein said aqueous dilute treatment composition comprises: water soluble bleach, selected from the group consisting of: chlorine bleach, peroxygen bleach and mixtures thereof; less than about 0.5% by weight of food compatible base-stable anionic detergent surfactant; optionally, from about 0.0005% to about 3% by weight of calcium ion sequestrant selected from the group consisting of water soluble salts of polyphosphates, organic polycarboxylic acid, and mixtures thereof; food compatible preservative; and food compatible suds suppresser.

24. The method of claim 23 wherein said aqueous treatment composition comprises: water soluble bleach selected from the group consisting of: hydrogen peroxide, perborate salts, or mixtures thereof to provide from about 20 to about 200 ppm available oxygen; less than about 0.1% by weight and sufficient to reduce the viscosity of said solution to less than about 10 cp., of food compatible base-stable sodium and/or potassium alkyl sulfate and/or $C_{8-18}$ soap; and optionally, from about 0.01% to about 0.5% by weight of salt of organic polycarboxylic acid.

25. The method of claim 23 wherein said aqueous treatment composition comprises: water soluble bleach selected from the group consisting of: hypochlorite salts, dichloroisocyanuric acid, trichloroisocyanuric acid, and/or sodium or potassium salts thereof to provide from about 0.5 to about 50 ppm available chlorine; less than about 0.2% by weight and sufficient to reduce the viscosity of said solution to less than about 50 cp., of food compatible base-stable anionic detergent surfactant; and optionally, from about 0.001% to about 1% by weight said calcium ion sequestrant, which is selected from the group consisting of sodium and/or tripolyphosphate, ethylenediaminetetraacetate, citrate, and mixtures thereof.

26. The method of claim 23 wherein said aqueous treatment composition comprises: water soluble bleach selected from the group consisting of: hypochlorite salts, dichloroisocyanuric acid, trichloroisocyanuric acid, and/or sodium or potassium salts thereof to provide from about 2 to about 5 ppm available chlorine; less than about 0.1% by weight and sufficient to reduce the viscosity of said solution to less than about 10 cp., of food compatible base-stable sodium and/or potassium alkyl sulfate and/or $C_{8-18}$ soap; and optionally, from about 0.01% to about 0.5% by weight of salt of organic polycarboxylic acid.

27. The method of claim 23 wherein said aqueous treatment composition comprises: water soluble bleach selected from the group consisting of: hydrogen peroxide, perborate salts, or mixtures thereof to provide from about 10 to about 1000 ppm available oxygen; less than about 0.2% by weight and sufficient to reduce the viscosity of said solution to less than about 50 cp., of food compatible base-stable anionic detergent surfactant; and optionally, from about 0.001% to about 1% by weight said calcium ion sequestrant, which is selected from the group consisting of sodium and/or tripolyphosphate, ethylenediaminetetraacetate, citrate, and mixtures thereof.

28. The method of claim 16 wherein said aqueous treatment composition comprises: water soluble antimicrobials; less than about 0.2% by weight and sufficient to reduce the viscosity of said solution to less than about 50 cp., of food compatible base-stable anionic detergent surfactant; and optionally, from about 0.001% to about 1% by weight said calcium ion sequestrant, which is selected from the group consisting of sodium and/or tripolyphosphate, ethylenediaminetetraacetate, citrate, and mixtures thereof.

29. The method of claim 28 wherein said aqueous treatment composition comprises: water soluble antimicrobials selected from the group consisting of: organic acids, quaternary sanitizers, phenols, biguanides, and mixtures thereof; less than about 0.1% by weight and sufficient to reduce the viscosity of said solution to less than about 10 cp., of food compatible base-stable sodium and/or potassium alkyl sulfate and/or $C_{8-18}$ soap; and optionally, from about 0.01% to about 0.5% by weight of salt of organic polycarboxylic acid.

30. The method of claim 16 wherein said aqueous treatment composition comprises: less than about 0.1% by weight and sufficient to reduce the viscosity of said solution to less than about 5 cp., of toxicologically-acceptable base-stable sodium and/or potassium alkyl sulfate and/or $C_{8-18}$ soap; and optionally, from about 0.01% to about 0.2% by weight of sodium ethylenediaminetetraacetate.

31. The method of claim 30 wherein said aqueous treatment composition comprises: less than about 0.1% by weight and sufficient to reduce the viscosity of said solution to less than about 5 cp., of toxicologically-acceptable base-stable sodium and/or potassium alkyl sulfate and/or $C_{8-18}$ soap; and optionally, from about 0.01% to about 1% by weight of sodium tripolyphosphate.

32. The method of claim 16 wherein at least about 50% of said non-substantive perfume comprises perfume components having a ClogP of less than about 3.5 and/or a boiling point of about 260° C. or tower and there are at least four different perfume components having a ClogP of less than about 3.5 and/or a boiling point of about 260° C. or lower.

33. The method of claim 32 wherein at least about 60% of said non-substantive perfume comprises perfume components having a ClogP of less than about 3.2 and/or a boiling point of about 255° C. or lower and there are at least five different perfume components having a ClogP of less than about 3.5 and/or a boiling point of about 260° C. or lower.

34. The method of claim 33 wherein at least about 70% of said non-substantive perfume comprises perfume components having a ClogP of less than about 3.0 and/or a boiling point of about 250° C. or lower and there are at least six different perfume components having a ClogP of less than about 3.5 and/or a boiling point of about 260° C. or lower.

35. The method of claim 34 wherein at least about 80% of said non-substantive perfume comprises perfume components having a ClogP of less than about 3.5 and/or a boiling point of about 260° C. or lower and there are at least seven different perfume components having a ClogP of less than about 3.5 and/or a boiling point of about 260° C. or lower.

36. The method of claim 32 wherein said perfume ingredients are selected from the group consisting of: allyl amyl glycolate, allyl caproate amyl acetate, amyl propionate, anisic aldehyde, anisyl acetate, anisole, benzaldehyde, benzyl acetate, benzyl acetone, benzyl alcohol, benzyl formate, benzyl iso valerate, benzyl propionate, beta gamma hexenol, calone, camphor gum, laevo-carveol, d-carvone, laevo-carvone, cinnamic alcohol, cinnamyl acetate, cinnamic alcohol, cinnamyl formate, cinnamyl propionate, cis-jasmone, cis-3-hexenyl acetate, coumarin, cuminic alcohol, cuminic aldehyde, Cyclal C, cyclogalbanate, dihydroeuginol, dihydro isojasmonate, dimethyl benzyl carbinol, dimethyl benzyl carbinyl acetate, ethyl acetate, ethyl aceto acetate, ethyl amyl ketone, ethyl anthranilate, ethyl benzoate, ethyl butyrate, ethyl cinnamate, ethyl hexyl ketone, ethyl maltol, ethyl-2-methyl butyrate, ethyl methylphenyl glycidate, ethyl phenyl acetate, ethyl salicylate, ethyl vanillin, eucalyptol, eugenol, eugenyl acetate, eugenyl formate, eugenyl methyl ether, fenchyl alcohol, flor acetate, fructone, frutene, geraniol, geranyl oxyacetaldehyde, heliotropin, hexenol, hexenyl acetate, hexyl acetate, hexyl formate, hinokitiol, hydratropic alcohol, hydroxycitronellal, hydroxycitronellal diethyl acetal, hydroxycitronellol, indole, isoamyl alcohol, iso cyclo citral, isoeugenol, isoeugenyl acetate, isomenthone, isopulegyl acetate, isoquinoline, keone, ligustral, linalool, linalool oxide, linalyl formate, lyral, menthone, methyl acetophenone, methyl amyl ketone, methyl anthranilate, methyl benzoate, methyl benzyl acetate, methyl cinnamate, methyl dihydrojasmonate, methyl eugenol, methyl heptenone, methyl heptine carbonate, methyl heptyl ketone, methyl hexyl ketone, methyl isobutenyl tetrahydropyran, methyl-N-methyl anthranilate, methyl beta naphthyl ketone, methyl phenyl carbinyl acetate, methyl salicylate, nerol, nonalactone, octalactone, octyl alcohol, para-anisic aldehyde, para-cresol, para-cresyl methyl ether, para hydroxy phenyl butanone, para-methoxy acetophenone, para-methyl acetophenone, phenoxy ethanol, phenoxy ethyl isobutyrate, phenoxyethyl propionate, phenyl acetaldehyde, phenylacetaldehyde diethyl ether, phenylethyl oxyacetaldehyde, phenyl ethyl acetate, phenyl ethyl alcohol, phenyl ethyl dimethyl carbinol, prenyl acetate, propyl butyrate, pulegone, rose oxide, safrole, terpineol, vanillin, viridine, allo-ocimene, allyl cyclohexanepropionate, allyl heptanoate, trans-anethole, benzyl butyrate, camphene, cadinene, carvacrol, cis-3-hexenyl tiglate, citronellol, citronellyl acetate, citronellyl nitrile, citronellyl propionate, cyclohexylethyl acetate, decyl aldehyde (capraldehyde), dihydromyrcenol, dihydromyrcenyl acetate, 3,7-dimethyl-1-octanol, diphenyloxide, fenchyl acetate, geranyl acetate, geranyl formate, geranyl nitrile, cis3-hexenyl isobutyrate, hexyl neopentanoate, hexyl tiglate, alpha-ionone, isobornyl acetate, isobutyl benzoate, isononyl acetate, isononyl alcohol, isopulegyl acetate, lauraldehyde, d-limonene, linalyl acetate, (−)1-menthyl acetate, methyl chavicol (estragole), methyl n-nonyl acetaldehyde, methyl octyl acetaldehyde, beta-myrcene, neryl acetate, nonyl acetate, nonaldehyde, p-cymene, alpha-pinene, beta-pinene, alpha-terpinene, gamma-terpinene, alpha-terpinyl acetate, tetrahydrolinalool, tetrahydromyrcenol, 2-undecenal, verdox, vertenex, and mixtures thereof.

37. An article of manufacture comprising a concentrated composition of claim 1 in a package in association with instructions to use the composition to form a dilute solution to treat food.

38. The article of manufacture of claim 37 wherein from about 0.01% to about 5% by weight of the concentrated composition is diluted to form a composition which has a viscosity less than about 50 centipoise under shear of greater than about 1000 sec$^{-1}$.

39. The article of manufacture of claim 37 wherein the instructions use pictures and/or icons.

* * * * *